US012477480B2

United States Patent
Meyuhas et al.

(10) Patent No.: US 12,477,480 B2
(45) Date of Patent: Nov. 18, 2025

(54) METHODS AND APPARATUS FOR A WIRELESS COMMUNICATION DEVICE TO ENABLE A BODY PROXIMITY SENSING OPERATION

(71) Applicant: Intel Corporation, Santa Clara, CA (US)

(72) Inventors: Gil Meyuhas, Tel Aviv (IL); Noam Kogos, Ramat Hasharon (IL); Adiel Langer, Petah Tiqwa (IL)

(73) Assignee: INTEL CORPORATION, Santa Clara, CA (US)

( * ) Notice: Subject to any disclaimer, the term of this patent is extended or adjusted under 35 U.S.C. 154(b) by 508 days.

(21) Appl. No.: 18/063,143

(22) Filed: Dec. 8, 2022

(65) Prior Publication Data

US 2024/0196345 A1   Jun. 13, 2024

(51) Int. Cl.
*H04W 52/36* (2009.01)
*H04W 52/28* (2009.01)

(52) U.S. Cl.
CPC ....... *H04W 52/367* (2013.01); *H04W 52/283* (2013.01)

(58) Field of Classification Search
CPC .......................... H04W 52/367; H04W 52/283
See application file for complete search history.

(56) References Cited

U.S. PATENT DOCUMENTS

| 10,965,335 | B1* | 3/2021 | Jadhav | H04B 1/3838 |
| 2012/0071195 | A1* | 3/2012 | Chakraborty | H04W 52/228 |
| | | | | 455/522 |
| 2017/0289929 | A1* | 10/2017 | Komulainen | G01V 3/08 |
| 2018/0288709 | A1* | 10/2018 | Yao | H04W 52/367 |
| 2022/0345168 | A1* | 10/2022 | El Hajj | H04W 52/225 |
| 2024/0106482 | A1* | 3/2024 | Forrester | H04B 1/3838 |

* cited by examiner

*Primary Examiner* — Fayyaz Alam
(74) *Attorney, Agent, or Firm* — VIERING, JENTSCHURA & PARTNER mbB

(57) ABSTRACT

Methods and apparatus are provided to control a body proximity sensing operation. An apparatus for a wireless communication device, the apparatus may include an interface to a radio frequency (RF) transceiver, and processing circuitry configured to: monitor one or more transmit power limitation parameters used to limit transmit power of transmissions of RF communication signals, and cause, based on a first transmit power limit including a monitored transmit power limitation parameter and a second transmit power limit, the RF transceiver to perform a body proximity sensing operation.

25 Claims, 8 Drawing Sheets

METHODS AND APPARATUS FOR A WIRELESS COMMUNICATION DEVICE TO ENABLE A BODY PROXIMITY SENSING OPERATION

TECHNICAL FIELD

This disclosure generally relates to methods and apparatus for a wireless communication device to enable a body proximity sensing operation.

BACKGROUND

With respect to many radio communication technologies, such as Fourth Generation (LTE) and Fifth Generation (5G) New Radio (NR), Wireless Local Area Network (WLAN), various limitations and constraints have been defined in order to limit exposure of radio frequency (RF) electromagnetic fields to humans. A commonly known measure, specific absorption rate (SAR) may be used to define the amount of RF energy absorbed by the human body. SAR measure may depend on the power of RF signals transmitted by the transmitter, the body part that is in the vicinity of the antenna transmitting the RF signals, in particular in the vicinity of a transmission direction to which the antenna transmits the RF signals, and the distance between the antenna and the body part.

In order to operate within SAR limits defined by various regulatory entities in various jurisdictions, communication devices may implement power back-off operations in which transmission power of RF signals is limited when a human body part is present within the vicinity of antennas. Body proximity sensing (BPS) operations may be used to detect the presence of objects within the vicinity of antennas, which may include monitoring for detection using RF signals.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
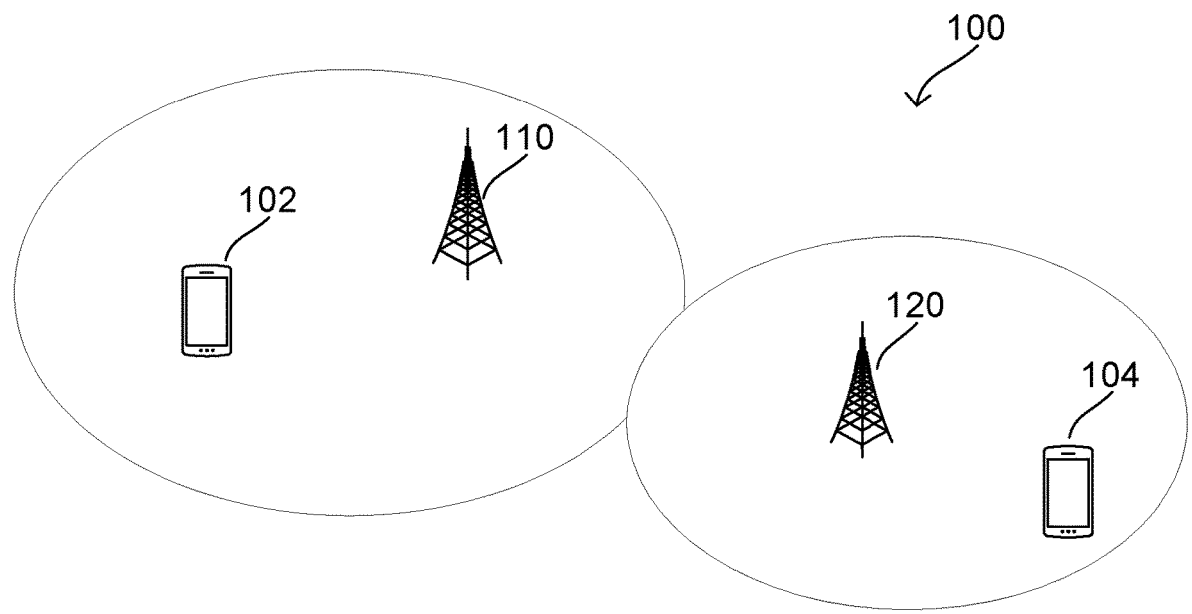
FIG. 1 shows an exemplary radio communication network.

The following detailed description refers to the accompanying drawings that show, by way of illustration, exemplary details and aspects in which aspects of the present disclosure may be practiced.

Radio communication devices employ various mechanisms to reduce RF radiation and operate in accordance with SAR constraints defined by regulatory entities. One of the mechanisms may include control of communication operations based on a presence of a human body part (i.e. presence of human) within a designated proximity to antennas. A radio communication device may, reduce the transmission power of radio communication signals to be transmitted by antennas, or may postpone the transmission of radio communication signals (e.g. when the human body part is not present in the transmission directions, or for a predefined time period), which will be referred to as a back-off operation (BO). The reduction of transmission power may be referred to as power back-off (PBO), and the postponement of communication may be referred to as a time back-off (TBO) in this disclosure.

There are various mechanisms employed for detection and/or triggering of a back-off operation. Some examples include a time averaged SAR, in which a radio communication device may aggregate transmission (TX) power over a defined time period and applying a BO based on the aggregated TX power and predefined limitations, such as maximum aggregated TX power defined by a particular regulatory entity. In some examples, the associated TX power to be aggregated may be assumed as the maximum TX power to derive the aggregated TX power according to a period of time in which the radio communication device transmits RF signals.

In order to implement a BO operation, RF circuits (e.g. RF transmitters) of a radio communication device may be configured to operate in a BO operation mode in which TX power of radio communication signals delivered to antennas are reduced (PBO) or in which transmission of radio communication signals are postponed (TPO), and thereby keep the operation of the radio communication device within a designated SAR budget (i.e. maximum allowable energy over a designated time period). The implementation of a BO operation may be provided via operations of supporting modules and components, such as proximity sensors, processing software for sensors, measurement circuits, etc. The RF circuits may apply the BO based on the detection of human presence.

Traditionally, a radio communication device may include one or more proximity sensors that are configured to detect a human body part within the vicinity of the antennas via various techniques, such as capacitive sensing techniques or via SAR sensors. A SAR sensor is a specific type of sensor that may be configured to distinguish the proximity of inanimate objects from the proximity of human body parts. There are various methods that a SAR sensor may apply to make the determination whether a proximate object is an inanimate object or a human body part, such as estimating that a proximate object is human based on movements of the respective object, triggered sensing elements, employment of capacitive sensing elements (e.g. whether the proximate object is a conductive object), etc. When a presence is detected within the vicinity, the designated sensors may provide an indication of the detection to the RF circuits, and the RF circuits may, in response to the indication, initiate the BO operation to apply the BO.

Implementation of dedicated sensors may be costly in terms of material costs and the form factor of the radio communication device, as such components may be expensive and may increase the size of the device or may cause further complexity in terms of the design of the radio communication device. Furthermore, depending on the type of sensors, the sensors may get dirty in time causing a reduction in the accuracy of proximity detection for a radio communication device, resulting in the application of BO operations incorrectly.

In various aspects provided herein, body proximity sensing (BPS) operations may include operations, which may detect the presence of objects, in particular human body parts, based on RF signals that the RF circuits are configured to transmit and/or receive. The RF circuits may detect the presence of an object based on received or transmitted RF signals, and initiate the BO operation based on transmitted and/or received RF signals. Such BPS operations may not have the disadvantages of dedicated proximity sensors as explained above in terms of material costs, form factor of the device, or inaccuracies in time. On the other hand, implementation of such BPS operations may occupy radio communication resources that may result in a decrease in the radio communication performance in terms of throughput, latency, and connection continuity, and may also increase power consumption of the RF circuits. In general, such BPS operations may occupy radio communication resources for a particular time period and for a particular frequency band to perform transmission of RF signals designated for proximity detection. Such RF signals may be referred to as RF proximity sensing signals, which may be, in various aspects, different from RF communication signals.

In various aspects provided herein, a radio communication device may initiate, and may control, BPS operations performed by an RF circuit, based on certain conditions. Such initiation and control may include a determination of certain triggering conditions and enabling or disabling the BPS operation based on the determination, since it may be desirable not to perform BPS operations all the time. Accordingly, the costs of BPS operations in terms of radio communication performance and power consumption may be reduced. For various aspects, it may be desirable to obtain more headroom within the designated SAR budget (e.g. a SAR limit) by controlling the BPS operations.

Some aspects provided herein may include the control of a BPS operation according to transmit power limitation parameters used to limit transmit power of RF communication signals. Considering that the application of a BO operation may not be necessary for certain transmit power configurations, due to transmit power being limited according to other limitations applied by non-SAR related operations of the radio communication device, the BPS operations may not be needed.

Some aspects provided herein may include the control of a BPS operation according to a time average specific absorption rate (TAS) metric associated with the radio communication operations. Considering that the amount of radiation over a particular period of time caused by transmit RF signals may vary in time, it may be desirable to trigger the BPS operations based on the TAS metrics. Accordingly, unnecessary BPS operations may be eliminated and the designated SAR budget may be increased.

It is to be noted that, various aspects provided herein may replace some of existing methods used for management of radiation to ensure the radio communication operates under a designated SAR limit, but it may also coexist with various existing methods, such as BO operations, proximity sensing, time averaged SAR measurements, employment of RF shields, antenna switching techniques (e.g. sounding reference signal (SRS) antenna switching technique as described in 3GPP technical specification (TS) 38.214), etc.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in a plural form that does not expressly state "plurality" or "multiple" likewise refers to a quantity equal to or greater than one.

Any vector and/or matrix notation utilized herein is exemplary in nature and is employed solely for purposes of explanation. Accordingly, the apparatuses and methods of this disclosure accompanied by vector and/or matrix notation are not limited to being implemented solely using vectors and/or matrices, and the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("IMTS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the apparatuses and methods described herein can also employ radio communication technologies on a secondary basis on bands such as the TV White Space bands (typically below 790 MHz) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception are handled by radio-layer components such as RF transceivers and antennas, and the logical transmission and reception over the software-level connection is performed by the processors or controllers. The term "communicate" encompasses one or both transmitting and receiving, i.e. unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations. The term "channel state information" is used herein to refer generally to the wireless channel for wireless transmission between one or more transmitting antennas and one or more receiving antennas and may take into account any factors that affect a wireless transmission such as, but not limited to, path loss, interference, and/or blockage.

An antenna port may be understood as a logical concept representing a specific channel or associated with a specific channel. An antenna port may be understood as a logical structure associated with a respective channel (e.g., a respective channel between a user equipment and a base station). Illustratively, symbols (e.g., OFDM symbols) transmitted over an antenna port (e.g., over a first channel) may be subject to different propagation conditions with respect to other symbols transmitted over another antenna port (e.g., over a second channel).

Figure 2:
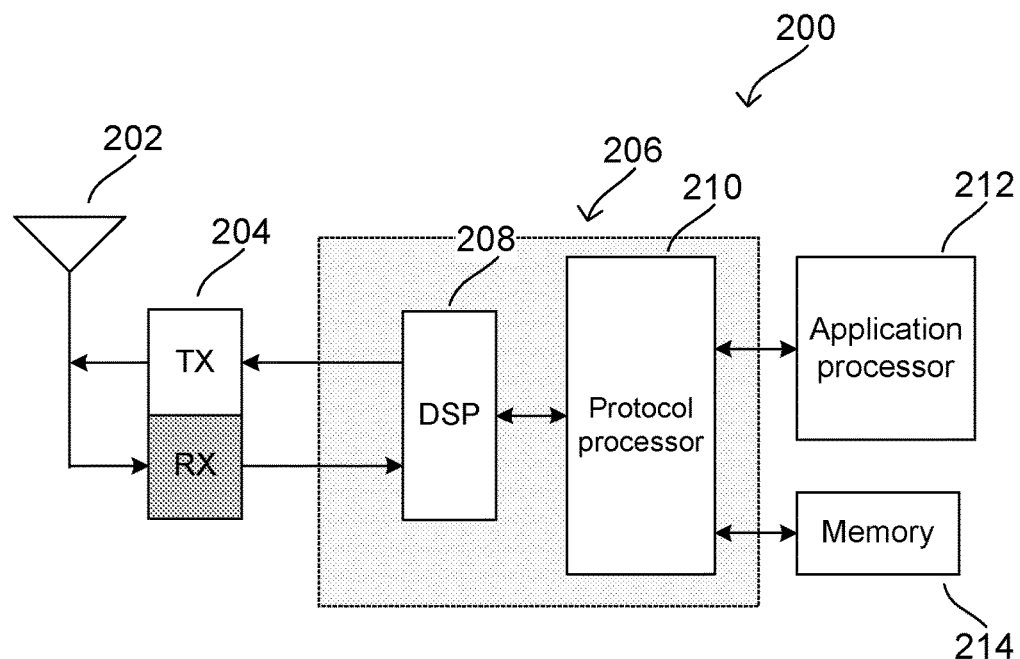
FIG. 2 shows an exemplary internal configuration of a communication device.

FIGS. 1 and 2 depict a general network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/ WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks. Network access nodes 110 and 120 and terminal devices 102 and 104 may include one or multiple transmission/reception points (TRPs).

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mm Wave, etc., any of which may be applicable to radio communication network 100.

FIG. 2 shows an exemplary internal configuration of a communication device according to various aspects provided in this disclosure. The communication device may include various aspects of network access nodes 110, 120 or various aspects of a terminal device 102 as well. The communication device 200 may include antenna system 202, radio frequency (RF) transceiver 204, baseband modem 206 (including digital signal processor 208 and protocol controller 210), application processor 212, and memory 214. Although not explicitly shown in FIG. 2, in some aspects communication device 200 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Communication device 200 may transmit and receive radio signals on one or more radio access networks. Baseband modem 206 may direct such communication functionality of communication device 200 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of communication device 200 shown in FIG. 2 depicts only a single instance of such components.

Communication device 200 may transmit and receive wireless signals with antenna system 202. Antenna system 202 may be a single antenna or may include one or more antenna arrays that each include multiple antenna elements. For example, antenna system 202 may include an antenna array at the top of communication device 200 and a second antenna array at the bottom of communication device 200. In some aspects, antenna system 202 may additionally include analog antenna combination and/or beamforming circuitry.

In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

In accordance with various aspects provided herein the RF transceiver 204 may be configured to perform a BO operation. Furthermore, the RF transceiver 204 may be configured to perform a BPS operation to detect a presence of an object within the proximity of the antenna system 202 used for wireless transmission. The BPS operation may include detecting the presence using RF signals transmitted or received by the RF transceiver 204. In various aspects, one of the processors, such as baseband modem 206 (including digital signal processor 208 and protocol controller 210) or application processor 212 may control the BPS operation in accordance with various aspects provided herein. In various examples, the communication device 200 may include a controller configured to control the BPS operation in accordance with various aspects provided herein.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Communication device 200 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of communication device 200 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of communication device 200 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio communication device 200 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Communication device 200 may also include application processor 212 and memory 214. Application processor 212 may be a CPU, and may be configured to handle the layers above the protocol stack, including the transport and application layers. Application processor 212 may be configured to execute various applications and/or programs of communication device 200 at an application layer of communication device 200, such as an operating system (OS), a user interface (UI) for supporting user interaction with communication device 200, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of communication device 200, such as a hard drive or another such permanent memory device. Although not explicitly depicted in FIG. 2, the various other components of communication device 200 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select \ available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

There are various aspects which the SAR measure, being a measure defined for energy absorbed per unit mass by a human body exposed to an RF electromagnetic field, may depend to. SAR measure for a sample (e.g. a human body part) may be based on electrical conductivity of the sample, density of the sample, volume of the sample, and the strength of electric field absorbed by the sample. Considering negative effects of absorption of radio waves transmitted by radio communication devices, SAR-related measurements are being used to ensure that radio communication devices operate under designated SAR limits. In particular, under consideration of regulatory SAR limits that may be defined based on particular SAR-related measurement conditions and environment, various SAR-related measurements may be used. Exemplarily, SAR can be calculated with an equation below, noting that being based on magnitude of the electric field, σ denoting sample electrical conductivity, E denoting root mean square (RMS) electric field, ρ denoting sample density, and V denoting the volume of the sample:

$$SAR = \frac{1}{V} \int_{sample} \frac{\sigma(r)|E(r)|^2}{\rho(r)}$$

Figure 3:
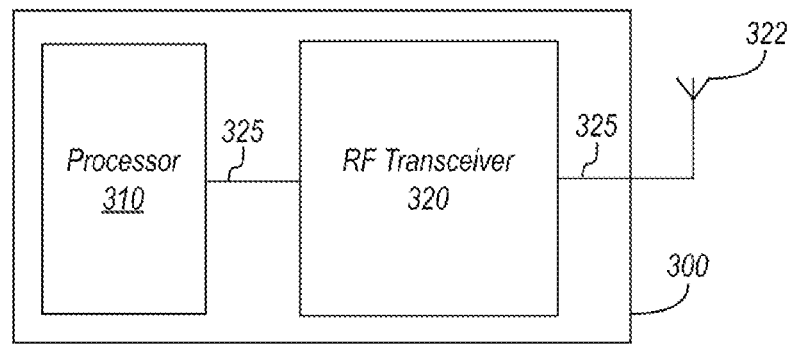
FIG. 3 shows an exemplary illustration of various communication elements of an apparatus for a wireless communication device.

FIG. 3 shows an exemplary illustration of various communication elements of an apparatus for a wireless communication device. The apparatus 300 may include processing circuitry 310 (e.g. the baseband modem 206, the application processor 212) that may direct and manage communication operations of the apparatus 300 according to one or more radio communication protocols, and may control transmission/reception of communication signals over at least one or more antenna 322 via an RF transceiver 320. The processing circuitry 310 may include an interface to the RF transceiver 320. The RF transceiver 320 may include at least one RF-chain to process the communication signals associated with the antenna 322 respectively. The apparatus 300 may include the antenna 322, or the apparatus 300 may include an antenna interface couplable to the antenna 322. It is to be noted that the apparatus 300 is depicted as being couplable to the antenna 322, but the apparatus 300 may be couplable to a plurality of antennas, and thereby the RF transceiver 320 may include a plurality of RF-chains, each RF-chain may process communication signals for a respective antenna. The apparatus 300 may transmit and receive radio communication signals with the antenna 322. The apparatus 300 may act as an RF transmitter (e.g. RF transmit circuit) to transmit radio communication signals and it may also act as an RF receiver (e.g. RF receive circuit) to receive radio communication signals.

The processing circuitry 310 may include, or may be implemented, partially or entirely, by circuit and/or logic, e.g., a processor including circuit and/or logic, a memory circuit and/or a logic, which may be configured to manage radio communication operations. The processing circuitry 310 may be configured to communicate with an external main processor (e.g. a host processor, a central processing unit (CPU), a system on chip (SoC)) of the wireless communication device including the apparatus 300 via a designated interface that is coupled to the main processor. In some examples, the processing circuitry 310 may be the main processor of the wireless communication device. The processing circuitry 310 may also access the main memory of the respective wireless communication device via the designated interface. The processing circuitry 310 may further include an interface to the RF transceiver 320.

The processing circuitry 310 may include a digital signal processor (e.g. the digital signal processor 208). The digital signal processor 208 may be configured to perform one or more of error detection, forward error correction encoding/decoding, channel coding, and interleaving, channel modulation/demodulation, physical channel mapping, radio measurement and search, frequency and time synchronization, antenna diversity processing, power control, and weighting, rate matching/de-matching, retransmission processing, interference cancelation, and any other physical layer processing functions.

The processing circuitry 310 may include a modem configured to process baseband signals received from/sent to the antenna 322 via a communication path 325 including a respective RF chain. In various examples, the interface to the RF transceiver 320 of the processing circuitry 310 may be configured to couple the processing circuitry 310 to the communication path 325. Accordingly, the processing circuitry 310 may include Media-Access Control (MAC) circuit and/or logic, Physical Layer (PHY) circuit and/or logic, baseband (BB) circuit and/or logic, a BB processor, a BB memory, Application Processor (AP) circuit and/or logic, an AP processor, an AP memory, and/or any other circuit and/or logic. By way of example, the processing circuitry 310 can perform baseband processing on the digital baseband signals to recover data included in wireless data transmissions.

The processing circuitry 310 may control and/or arbitrate transmit and/or receive functions of the apparatus 300, and perform one or more baseband processing functions (e.g., media access control (MAC), encoding/decoding, modulation/demodulation, data symbol mapping, error correction, etc.). The processing circuitry 310 may be configured to provide control functions to the RF transceiver 320 (e.g. to the RF-chain to control and/or arbitrate transmitting and/or receiving radio communication signals). In aspects, functions of processing circuitry 310 can be implemented in software and/or firmware executing on one or more suitable programmable processors, and may be implemented, for example, in a field programmable gate array (FPGA), application specific integrated circuit (ASIC), etc. In various examples, the interface to the RF transceiver 320 of the processing circuitry 310 may be configured to couple processing circuitry to the RF transceiver to provide communication in-between.

The RF transceiver 320 may provide RF processing of communication signals conveyed via a communication path within a respective RF chain to transmit radio communication signals via a respective antenna based on signals (e.g. baseband communication signals, digital signals) received from the processing circuitry 310 over the communication path. The RF transceiver 320 may provide RF processing of communication signals conveyed via the communication path 325 to receive radio communication signals via the antenna 322 and provide signals to the processing circuitry 310 over the communication path 325. The processing circuitry 310 may be configured to control operations of the RF transceiver 320. The RF transceiver 320 may include a receive path to provide RF processing to receive radio communication signals received from the antenna 322, and a transmit path to provide RF processing to transmit radio communication signals transmitted via the antenna 322.

In a receive (RX) path, The RF transceiver 320 may receive analog radio frequency signals from the antenna 322 via the communication paths 325 and perform analog and digital RF front-end processing on the analog radio frequency signals to produce digital baseband samples (e.g., In-Phase/Quadrature (IQ) samples) to provide to the processing circuitry 310. In various examples, RF transceiver 320 may include two RF-chains per antenna element, each of RF-chains may be designated for a particular polarization. The RF transceiver 320 may include analog and digital reception components including amplifiers (e.g., Low Noise Amplifiers (LNAs)), filters, RF demodulators (e.g., RF IQ demodulators)), and analog-to-digital converters (ADCs), which RF transceiver 320 may utilize to convert the received radio frequency signals to digital baseband samples.

In a transmit (TX) path, the RF transceiver 320 may receive digital baseband samples from processing circuitry 310 and perform analog and digital RF front-end processing on the digital baseband samples to produce analog radio frequency signals to be provided to the antenna 322 via the communication paths 325 for radio transmission. The RF transceiver 320 may thus include analog and digital transmission components including amplifiers (e.g., Power Amplifiers (PAs), filters, RF modulators (e.g., RF IQ modulators), and digital-to-analog converters (DACs), which the RF transceiver 320 may utilize to mix the digital baseband samples received from processing circuitry 310 and produce respective analog radio frequency signals for radio transmission by the antenna 322. In some aspects, the processing circuitry 310 may control the radio transmission and reception of the RF transceiver 320, including specifying the transmit and receive radio frequencies for the operation of the RF transceiver 320.

In accordance with various aspects provided herein, the RF transceiver 320 may be configured to apply a BO operation. Processing circuitry may control the application of the BO operation. In various examples, the processing circuitry 310 may control the application of the BO operation, and various aspects provided in this disclosure may illustrate that the processing circuitry 310 (i.e. the processing circuitry that controls the RF transceiver 320) controls the application of the BO operation, but this should not be limiting. In some examples, further processing circuitry (e.g. a controller) coupled to the RF transceiver 320 may be configured to control the BO operation. In some examples, the RF transceiver 320 may include the further processing circuitry. A BO operation may include a PBO. The processing circuitry 310 may be configured to control one or more components of the RF transceiver 320 to apply the BO operation. The application of the BO operation may include the application of a BO operation to the RF transceiver 320, in particular to all RF-chains of the RF transceiver. In various examples, the application of the BO operation may include the application of a BO operation individually for RF-chains of the RF transceiver, or selectively for some of the RF-chains, in cases in which the RF transceiver 320 may include multiple RF-chains for multiple antennas.

Application of a BO operation may include at least one of adjusting transmit power for radio communication signals to be transmitted by the antenna 322, setting a maximum transmit power value at a respective memory (e.g. a register), which may define a transmit power limit for one or more radio communication signals to be transmitted by the antenna 322, controlling an operation mode or a gain of an amplifier coupled to the antenna 322, controlling a supply power controller that may provide power to some components which may include amplifiers of the RF transceiver 320. The processing circuitry 310 may be configured to control the application of the BO.

Figure 4:
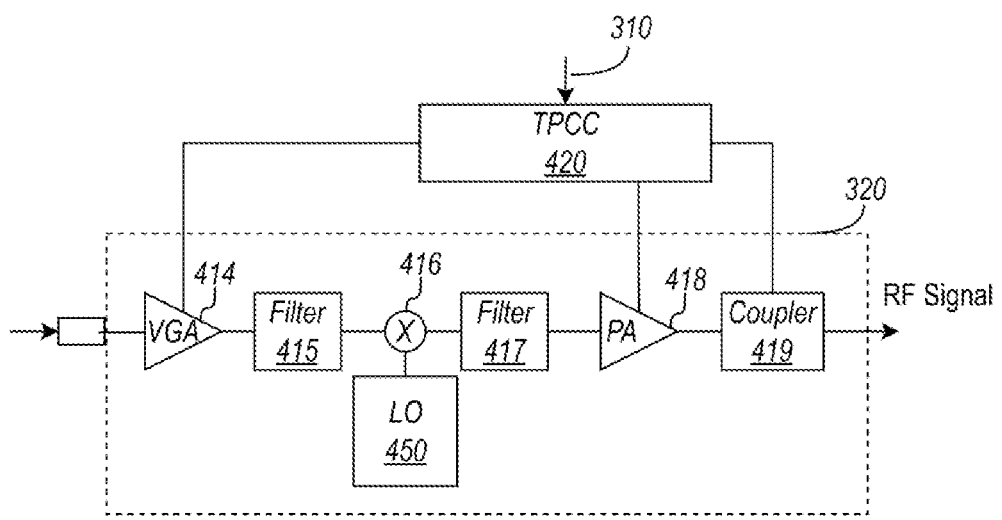
FIG. 4 shows an exemplary illustration of a transmit path of an RF transceiver.

FIG. 4 shows an exemplary illustration of a transmit path of an RF transceiver. The RF transceiver 320 may be couplable to processing circuitry (e.g. the processing circuitry 310) over an interface. The interface may include a communication path designated to carry communication signals between the processing circuitry and an antenna. In some examples, the interface may include a further circuit path to provide communication between the RF transceiver 320 and the processing circuitry for control of the operations. The RF transceiver 320 may further include further components and or circuits, such as further filter circuits, synthesizer circuits, etc. that are not depicted here. The RF transceiver 320 may include various circuits and components deployed on the respective transmission path. The RF transceiver may include DACs to convert I/Q signals received from modem, respective intermediate frequency (I/F) amplifiers to amplify received I/Q signals, an I/Q modulator to modulate received I/Q signals, etc. that are not depicted here.

The RF transceiver 320 may include a variable gain amplifier (VGA) 414 for a first amplification of analog signals received from the modem (e.g. the processing circuitry 310 or a separate modem), a band filter 415 to filter first amplified signals, a local oscillator 450 and a mixer 416 to upconvert received signals to a designated RF carrier frequency band. A second band filter 417 may be employed to filter output of mixer 416. The RF transceiver 320 may further include a power amplifier (PA) 418 configured to amplify RF signals. The RF transceiver may be couplable to an antenna for transmission of RF signals amplified by the PA 418. In some examples, the RF transceiver 320 may include further components before it is coupled to the respective antenna, such as phase shifters, precoders, a matching circuit, etc.

It is to be noted that the PA 418 or VGA 414 may include any type of amplifier circuit suitable for the respective communication technology and the desired use case. The RF transceiver 320 may include various power amplifiers for various purposes, such as an amplifier for cellular communication, an amplifier for WLAN communication, a middle band amplifier, a high band amplifier, a middle and high band amplifier, an ultra-high band amplifier. Furthermore, the amplifier may be a module, such as a power amplifier and a duplexer module.

A transmit power control circuit (TPCC) 420 may control the power of RF signals to be transmitted by the antenna (i.e. transmit RF signals). In some examples, the RF transceiver 320 may include the TPCC 420. The TPCC 420 may control the power of the transmit RF signals based on information (e.g. signals) received from the processing circuitry 310. The processing circuitry 310 may cause the TPCC 420 to set the power for transmit RF signals (i.e. transmit power) to a designated transmit power value, and/or increase or decrease the transmit power, limit the transmit power to a designated transmit power limit, e.g. by controlling the PA 418 and/or VGA 414. The TPCC 420 may configure amplification rates of the power amplifier 418 and/or the variable gain amplifier 414 based on the information received from the processing circuitry. In various examples, the TPCC 420 may control the transmit power dynamically to increase spectral efficiency, to reduce interference. The TPCC 420 may be configured to implement any known transmit power control methods or dynamic transmit power control methods.

The TPCC 420 may be configured by the processing circuitry 310 to control transmission power of the antenna according to designated power values or configurations to maintain communication between the transmitting entity and the respective receiving entity. In various aspects, the TPCC 420 may monitor the TX power of radio communication signals. The TPCC 420 may be coupled to the transmission path via a coupler 419 to measure power of radio communication signals. In some examples, the processing circuitry may set transmit power limits stored in a memory. In some examples, the TPCC 420 may include a controller configured to set transmit power limits.

In some aspects, the RF transceiver 320 may be further configured to apply a BO operation for the transmit path based on the information received from the processing circuitry 310. In such examples, the processing circuitry 310 may cause the RF transceiver 320 to reduce the transmit power of the radio communication signals to be transmitted by the antenna. In addition to the above-mentioned operations of the TPCC 420, the application of the BO may include reducing the transmit power such that the antenna transmits no radio communication signals. In some aspects, the RF transceiver 320 may apply the BO operation via the TPCC 420 to reduce the transmit power. The BO operation may include controlling the transmit power based on an upper limit defining the maximum amount of transmit power with which the RF signals are to be transmitted.

In some aspects, the processing circuitry 420 may cause the TPCC 420 to reduce the upper limit defining the maximum amount of TX power associated for RF transmission of the RF transceiver 320. In such cases, the TPCC 420 may set the TX power to any power amount that is below the upper limit. Additionally, or alternatively, the RF transceiver 320 may include a designated controller that is configured to control various components of the transceiver 320 including illustrated components/circuits to apply the BO individually for the RF transceiver 320, which may, in particular, include controlling gains or amplification configurations of the amplifiers 414, 418.

In accordance with various aspects provided herein, the RF transceiver 320 may be configured to perform a BPS operation. A BPS operation may include any operation through which the wireless communication device may monitor presence of an object within a proximity of the wireless communication device, in particular within a proximity to the antenna 322, using RF signals transmitted by the RF transceiver 320. In various examples, the object may be particularly a human body part. Through an initiated BPS operation, the wireless communication device may detect the presence of an object within the proximity of the antenna 322, and control the application of the BO operation according to the PBS operation. Exemplarily, the processing circuitry 310 may trigger the BO operation in case the PBS operation indicates a detection of an object presence (e.g. human body part presence) within the proximity of the antenna.

Figure 5A:
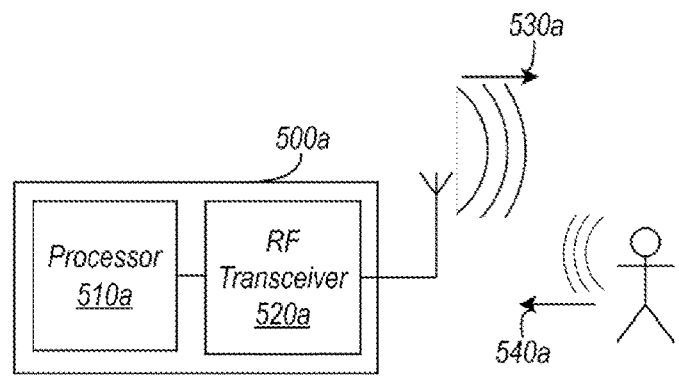
FIG. 5A shows an illustration of an exemplary BPS operation.

FIG. 5A shows an illustration of an exemplary BPS operation. For a wireless communication device 500*a* including a processor 510*a* (e.g. the processing circuitry 310) and an RF transceiver 520*a* (e.g. the RF transceiver 320), an exemplary BPS operation may include transmissions 530*a* of RF signals, receiving 540*a* signals in response to the transmissions 530*a*, and processing received signals in a radar-like application (e.g. a Frequency Modulated Continuous Wave (FMCW) radar). For example, transmitted RF signals for the BPS operation (e.g. RF proximity sensing signals) may include RF signals designated to perform the BPS operation (e.g. mmWave RF signals), which may be different from RF communication signals used to perform radio communication operations of the RF transceiver 520*a*. Furthermore, a measurement circuit may measure the signals received in response to the transmitted RF proximity sensing signals and the processor 510*a* may determine if an object is detected according to the measurements. The measurements may exemplarily include doppler measurements.

Figure 5B:
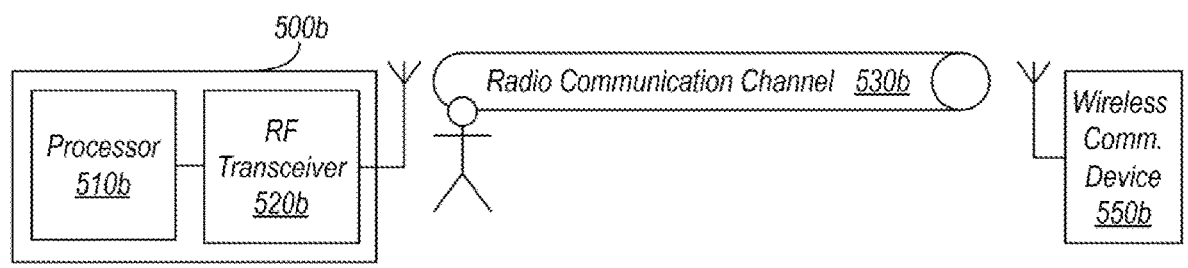
FIG. 5B shows an illustration of an exemplary BPS operation.

FIG. 5B shows an illustration of an exemplary BPS operation. For a wireless communication device 500*b* including a processor 510*b* (e.g. the processing circuitry 310) and an RF transceiver 520*b* (e.g. the RF transceiver 320), an exemplary BPS operation may include monitoring conditions of an established radio communication channel 530*b*. The established radio communication channel 530*b* may be between the wireless communication device 500*b* and a further wireless communication device 550*b*. The processor 510*b* may determine if an object is detected according to a detected and/or identified change in the conditions of the established radio communication channel 530*b*. In some aspects, the exemplary BPS operation provided herein may be referred to as Wi-Fi sensing.

Such a BPS operation may exemplarily include transmissions of RF proximity sensing signals via the established radio communication channel 530*b*. The further wireless communication device 550*b* may report measurements according to received RF proximity sensing signals, and the processor 510*b* may determine if an object is detected based on received measurements. Additionally or alternatively, the further wireless communication device 550*b* may send received RF proximity sensing signal back to the wireless communication device 500*b*, on which the wireless communication device 500*b*, via a measurement circuit of the RF transceiver 520*b*, may perform measurements to obtain channel conditions of the established radio communication channel 530*b*, and the processor 510*b* may determine if an object is detected based on measurements performed on signals received from the further wireless communication device 500*b*. In some examples, the step of transmitting RF proximity sensing signals may be omitted, and the further wireless communication device 550*b* may transmit RF proximity sensing signals, which may include reference signals. The wireless communication device 500*b* may determine channel conditions based on received RF proximity sensing signals, and the processor 510*b* may determine if an object is detected according to determined channel conditions.

Figure 5C:
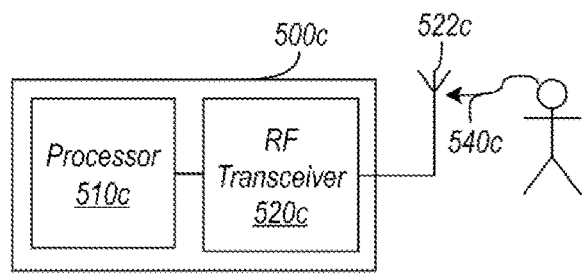
FIG. 5C shows an illustration of an exemplary BPS operation.

FIG. 5C shows an illustration of an exemplary BPS operation. For a wireless communication device 500*c* including a processor 510*c* (e.g. the processing circuitry 310), an RF transceiver 520*c* (e.g. the RF transceiver 320), and an antenna 522*c* coupled to the RF transceiver 520*c*, an exemplary BPS operation may include monitoring RF signals reflected when transmitting RF proximity sensing signals for detecting detuning of the antenna 522*c* caused by an approaching 530*c* object. The RF proximity sensing signals may include RF communication signals designated for measurements, by a measurement circuit of the RF transceiver 520*c*, for monitoring. Commonly, measurements may include VSWR measurements of the antenna 522c, and the processor 510c may determine if an object is detected according to measurements of reflected RF signals (e.g. VSWR measurements).

As it can be seen exemplarily from FIGS. 5A-C, a BPS operation may cause an RF transceiver 520a-c to transmit RF proximity sensing signals or receive RF proximity sensing signals, which may be collectively referred to as RF proximity sensing. Based on an outcome of RF proximity sensing, an object presence is determined. For transmission/reception of RF proximity sensing signals, resources of the RF transceiver 520a-c may use its resources for this purpose instead of RF communication (i.e. data communication for RF communication operations) with a further wireless communication device.

In some aspects, a BPS operation may cause an RF transceiver to perform RF proximity sensing multiple times at designated intervals. Exemplarily, a BPS operation may include a plurality of RF proximity sensings performed periodically. Within two RF proximity sensing, the RF transceiver may still perform RF communication operations and transmit and/or receive RF communication signals. In some examples, a BPS operation may include a plurality of RF proximity sensings, wherein the processor 510a-c may trigger each RF proximity sensing. Triggering of the processor may be periodically, or may be based on further considerations, such as scheduled RF communication operations, amount of data in TX buffers, a quality of service (QOS) metric associated with an established communication channel, etc.

In accordance with various aspects provided herein, an RF transceiver (e.g. the RF transceiver 320) may, for a designated time and/or frequency resource, selectively perform a BPS operation to detect objects within proximity by transmitting or receiving RF proximity sensing signals or a radio communication operation by transmitting or receiving RF communication signals.

Figure 6:
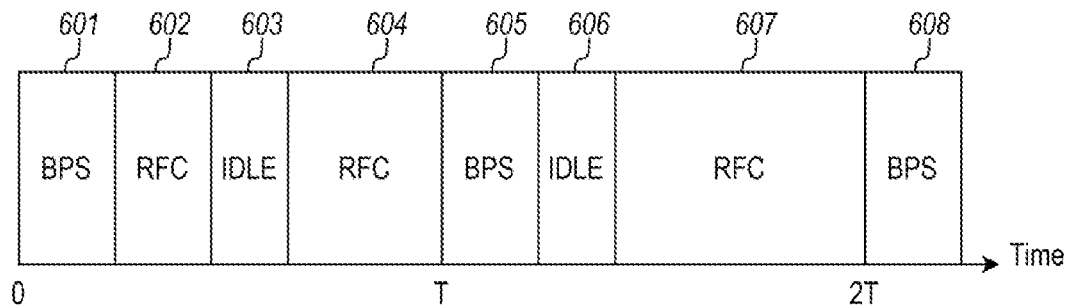
FIG. 6 shows an exemplary illustration of a timing diagram for operations performed by an RF transceiver.

FIG. 6 shows an exemplary illustration of a timing diagram for operations performed by an RF transceiver. An RF transceiver (e.g. the RF transceiver 320) configured to perform communication operations and BPS operations, may, at an instance of time, selectively perform one of a BPS operation via RF proximity sensing signals, an RF communication operation via RF communication signals, or may not transmit and/or receive RF signals (i.e. idle). In this illustrative timing diagram, the RF transceiver may, in a first time slot 601, perform a BPS operation (e.g. any aspects provided in accordance with FIGS. 5A-C involving transmission or reception of RF proximity sensing signals). The RF transceiver may, in a second time slot 602, perform an RF communication operation by transmitting and/or receiving radio communication signals from one or more further wireless communication devices. The RF transceiver may, in a third time slot 603, become idle and do not transmit and/or receive any RF signals. In a fourth time slot 604, the RF transceiver may perform a further RF communication operation. The timing diagram continues with a fifth time slot 605 designated for a BPS operation, a sixth time slot 606 designated for idle, a seventh time slot 607 for a further RF communication operation, and an eighth time slot for a BPS operation.

A processor (e.g. the processing circuitry 310) may designate and control time periods in which the RF transceiver performs the BPS operation. Furthermore, in particular when the processor is also the processor that controls radio communication operations of the RF transceiver, the processor may further designate and control time periods in which the RF transceiver performs RF communication operations or stays idle. This illustrative example shows that the RF transceiver is configured to perform BPS operations periodically with a period T. The processor may control, e.g. in response to a received instruction or according to aspects provided herein, the RF transceiver to initiate a BPS operation and/or cause the RF transceiver to perform a BPS operation. In some examples, the processor may signal the RF transceiver to initiate a BPS operation. In some examples, the processor may configure the RF transceiver to perform BPS operation based on a criterion or criteria (e.g. periodically, further based on scheduled RF communication operations, etc.). In some examples, the processor may schedule BPS operations in the same manner that RF communication operations are scheduled.

Figure 7:
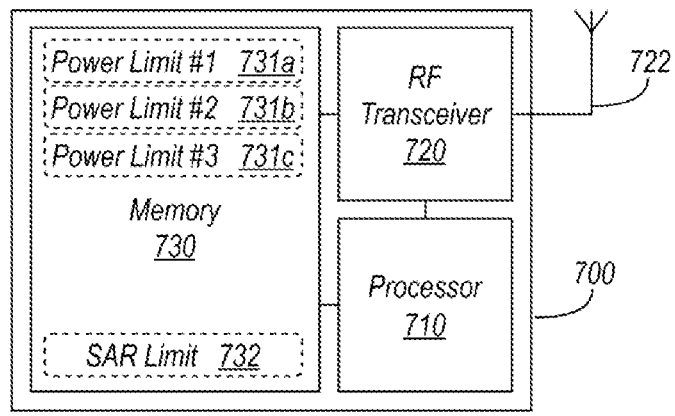
FIG. 7 shows an exemplary illustration of an apparatus for a wireless communication device.

FIG. 7 shows an exemplary illustration of an apparatus for a wireless communication device. The apparatus 700 may include a processor 710 (e.g. the processing circuitry 310). The processor 710 may direct and manage communication operations of the apparatus 700 according to one or more radio communication protocols, and the processor 710 may control transmission/reception of communication signals over at least one or more antenna 722 via an RF transceiver 720.

The processor 710 may include an interface to the RF transceiver 720 to provide a control of various aspects provided herein. In various examples, the interface may allow the processor 710 and the RF transceiver 720 to communicate information (e.g. control signals, measurements, etc.). In some examples, the interface may include the communication path used to exchange receive/transmit communication signals. In some examples, the interface may include one or more designated paths. The processor 710 may send suitable control signals to the RF transceiver 710, in particular to corresponding control circuits of the RF transceiver (e.g. a TPCC, a further BO control circuit, a BPS control circuit) respectively to control the radio communication operation, BO operation, or BPS operation.

The RF transceiver 720 may include at least one RF-chain to process RF signals of antenna 722 respectively. The apparatus 700 may include the antenna 722, or the apparatus 700 may include an antenna interface couplable to the antenna 722. It is to be noted that the apparatus 700 is depicted as being couplable to the antenna 722, but the apparatus 700 may be couplable to a plurality of antennas, and thereby the RF transceiver 720 may include a plurality of RF-chains, each RF-chain may process communication signals for a respective antenna. The apparatus 700 may transmit and receive radio communication signals with the antenna 722. The apparatus 700 may act as an RF transmitter (e.g. RF transmit circuit) to transmit radio communication signals and it may also act as an RF receiver (e.g. RF receive circuit) to receive radio communication signals.

In accordance with various aspects provided herein, the RF transceiver 720 may be configured to apply a BO. In various examples, the processor 710 may control the application of the BO. A BO may include a PBO. The processor 710 may be configured to control one or more components of the RF transceiver 720 to apply the BO. The application of the BO operation may include the application of a BO operation to the RF transceiver 720, in particular to all RF-chains of the RF transceiver. In various examples, the application of the BO operation may include the application of different BO operations individually for RF-chains of the RF transceiver, or selectively for some of the RF-chains, in cases in which the RF transceiver 720 may include multiple RF-chains for multiple antennas.

Application of a BO operation may include at least one of adjusting transmit power for radio communication signals to be transmitted by the antenna 722, setting a maximum transmit power value at a respective memory (e.g. a register), which may define a transmit power limit for one or more radio communication signals to be transmitted by the antenna 722, controlling an operation mode or a gain of an amplifier coupled to the antenna 722, controlling a supply power controller that may provide power to some components which may include amplifiers of the RF transceiver 720. The processor 710 may be configured to control the application of the BO.

In an RF communication operation, the RF transceiver 720 may be configured to transmit RF communication signals (i.e. provide RF communication signals to the antenna 722 for transmission) which transmit powers (TX power) of the RF communication signals are limited based on one or more TX power limitation parameters. In addition to a designated limitation of SAR, which may include a limit in terms of energy (i.e. total power for a certain period of time), it may be desired to limit TX power of the wireless communication device due to various reasons. Considering the presence of a plurality of TX power limitation parameters corresponding to multiple TX power values, the TX power of an RF communication signal that is set may be limited practically with the minimum TX power value of the multiple TX power values.

Exemplarily, regulatory entities in certain jurisdictions may define a TX power limit (e.g. a maximum transmit signal power value) to be applied. Furthermore, an access node with which the wireless communication device communicates may define a TX power limit of the network. In some examples, the RF transceiver 720 may apply a TX power limit based on a feedback mechanism, exemplarily to increase spectral efficiency of radio communication or to reduce interference. Furthermore, the processor 710 may, due to various employed mechanism, determine TX power limits for the wireless communication device (to be referred to as "system TX power limits"), exemplarily to reduce use of resources in terms of power consumption, to reduce temperature of the RF circuits employed for transmission of RF signals, to reduce interference, to increase spectral efficiency, etc.

The nature of TX power limitation parameters may be based on the implementation of respective control mechanisms used to determine such TX power limits respectively. A TX power limitation parameter may be static and may exemplarily include a particular TX power value designated for transmission of an RF signal. For example, regulatory TX power limits are generally defined as multiple predefined TX power values for multiple frequency bands, each predefined TX power value may correspond to a frequency band and accordingly it may be static in nature depending on the frequency band used for RF signals. Furthermore, in some TPC methods, an access node or a further wireless communication device that communicates with the wireless communication device using the apparatus 700 may define a TX power limit for the wireless communication device.

Furthermore, a TX power limitation parameter may be a dynamic parameter to limit TX power based on a context associated with operations of the wireless communication device. For example, the control of the TX power may include a dynamic control power based on a feedback mechanism to reduce interference caused by transmissions to other communication devices, or to increase spectral efficiency. A TPCC may include a feedback circuit to implement the feedback mechanism. Furthermore, some system power limits may be dynamic in nature based on a context associated with a further component or a module of the wireless communication device, such as a system TX power limit for power consumption may be based on a state of a battery of the wireless communication device (or other power consumption-related status), or a system TX power limit associated with temperature may be based on a measured temperature, etc.

The RF transceiver 720 may be configured to perform a BPS operation. In a BPS operation, the RF transceiver 720 may perform monitoring to detect an object (e.g. a human body part) within a proximity of the antenna 722 using RF proximity sensing signals. Accordingly, the RF transceiver 720 may be configured to generate transmit RF proximity sensing signals and perform measurements associated with transmitted RF proximity sensing signals (e.g. FIGS. 5A-C) for detection of an object within the proximity of the antenna 722. The processor 710 may determine a detection of an object based on a performed BPS operation, which may be based on performed measurements.

In accordance with various aspects provided herein, the processor 710 may control the BPS operation. The processor 710 may cause the RF transceiver 720 to initiate a BPS operation, to cease an initiated BPS operation, change control parameters associated with the BPS operation such as periodicity of the BPS operation, settings associated with RF proximity sensing signal generation (e.g. frequency band, modulation, used reference signals), etc.

The apparatus may include a memory 730 configured to store a SAR limit 732 that is designated particularly to limit SAR. The stored SAR 732 limit may be a predetermined SAR limit. Practically, a SAR limit may be a TX power limit, as the SAR measure is proportional to TX power of transmit RF communication signals. The predetermined SAR limit may include a predetermined TX power limit to be used to limit TX power of transmit RF communication signals. It may be a predefined static TX power limit. In some aspects, the processor 710 may determine the TX power limit based on SAR-related operations of the wireless communication device. Exemplarily, the processor 710 may determine a TX power limit dynamically based on a designated SAR budget (e.g. an amount of total TX power over a designated period of time) and an estimated, and/or calculated, and/or measured total TX power of transmitted RF communication signals (e.g. a time average SAR metric).

The processor 710 may monitor TX power limitation parameters arranged to limit TX power of transmit RF communication signals. Based on the monitoring of the TX power limitation parameters, the processor 710 may cause, based on monitored TX power limitation parameters and the SAR limit 732, the RF transceiver 720 to perform the BPS operation. The processor 710 may determine a determination result representing whether to perform the BPS operation or not based on a first power limit based on a monitored TX power limitation parameter and a second power limit based on the SAR limit 732. Based on the determination result representing that the BPS operation is to be performed, the processor 710 may cause the RF transceiver 720 to perform the BPS operation. Furthermore, based on a further determination result, determined according to a further monitored TX power limitation parameter at a further instance time and the SAR limit 732, representing that the BPS operation is not to be performed, the processor 710 may cause the RF transceiver 720 to cease an initiated BPS operation.

Exemplarily, each monitored TX power limitation parameter may include a maximum TX power value and the SAR limit may include a further maximum TX power value, each maximum transmit value being arranged for respective TX power limitation. The processor 710 may determine the determination result by comparing the corresponding maximum TX power value associated with the first power limit and SAR maximum TX power value. In some aspects, the processor 710 may calculate a maximum TX power value associated with a monitored TX power limitation parameter based on a predefined mapping operation configured to map the monitored TX power limitation parameter (e.g. a measured temperature, a current battery state, or a current power consumption state) to a maximum TX power value.

The processor 710 may determine the determination result by comparing each maximum TX power value corresponding to monitored TX power limitation parameters respectively with the SAR limit 732. The processor 710 may determine the determination result by comparing the lowest maximum TX power value among the maximum TX power values corresponding to monitored TX power limitation parameters with the SAR limit 732. The processor 710 may determine a first determination result indicative of performing a BPS operation in case the SAR limit value is lower than the compared maximum TX power value(s). The processor 710 may determine a second determination result indicative of not performing a BPS operation in case the SAR limit value is greater than the compared maximum TX power value(s).

In some aspects, the memory 730 may store TX power limitation parameters 731a-c used to limit TX power of transmit RF communication signals. In some aspects, the processor 710 may control TX power limits of transmit RF communication signals based on TX power limitation parameters 731a-c stored in the memory 730. Based on the stored TX power limitation parameters 731a-c, and optionally the stored SAR limit 732, the processor 710 may configure a TPCC configured to control TX power of transmit RF communication signals. Accordingly, the maximum TX power of a transmit RF communication signal may be based on the one of the stored TX power limitation parameters 731a-c. A stored TX power limitation parameter may result in a minimum TX power value for the transmit RF communication signal among all stored TX power limitation parameters.

The apparatus 700 may include a TPCC coupled to the RF transceiver. The TPCC may be configured to generate control signals for controlling TX power of transmit RF communication signals. The TPCC may output generated control signals to an amplifier of the RF transceiver (e.g. a PA or a VGA within a transmit path used to transmit RF communication signals). The amplifier may be configured to amplify input communication signals based on control signals outputted by the TPCC.

The processor 710 may determine TX power of transmit RF communication signals in consideration of TX power limitation parameters 731a-c stored in the memory 730, and optionally the SAR limit 732. Based on these parameters, and further TX power parameters that may exemplarily depend on the quality (e.g. at least one quality metric) of the radio communication channel, the processor 710 may determine a TX power for a transmit RF communication signal. The determined TX power may not exceed at least the lowest TX power value corresponding to the TX power limitation parameters 731a-c. The processor 710 may, based on the determined TX power, control the TX power for the corresponding transmit RF communication signal by setting the gain of the amplifier via the TPCC.

Figure 8:
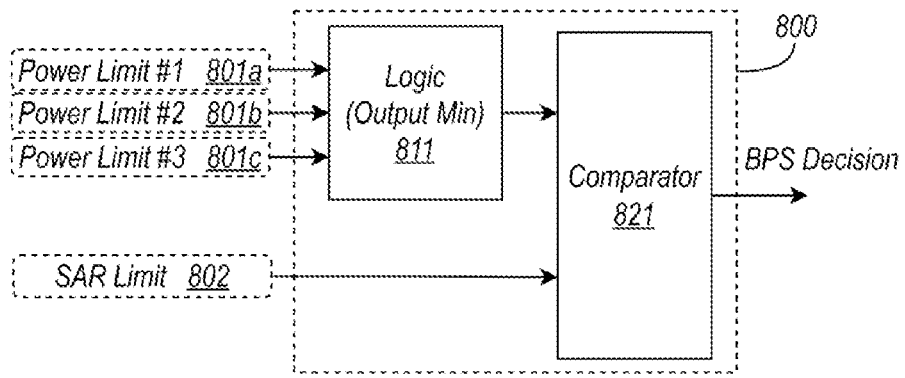
FIG. 8 shows an example of processing circuitry in accordance with various aspects provided herein.

FIG. 8 shows an example of processing circuitry in accordance with various aspects provided herein. The processing circuitry 800 may include a logic 811 configured to receive TX power limit values 801a-c associated with TX power limitation parameters used to limit TX power of transmit RF communication signals and output minimum received TX power limit value. The processing circuitry 800 may further include a comparator 821 configured to compare the minimum received TX power limit value and the SAR limit value 802 and provide an output representing whether to perform a BPS operation or not.

Illustratively, for a scenario in which a first power limit 801a, a second power limit 801b, and a third power limit 801c being 15 dBm, 16 dBm, and 17 dBm respectively, and the SAR limit being 18 dBm, RF transceiver may limit the TX power according to the first power limit 801a, namely for 15 dBm. As the TX power of corresponding transmit RF communication signal is limited to 15 dBm, which is already below the SAR limit being 18 dBm, the comparator 821 may output a determination result representing not to perform the BPS. Accordingly, RF transceiver does not perform the BPS operation. In case there is an initiated BPS operation, the RF transceiver may cease the initiated BPS operation.

Illustratively, for another scenario in which a first power limit 801a, a second power limit 801b, and a third power limit 801c being 15 dBm, 16 dBm, and 17 dBm respectively, and the SAR limit being 14 dBm, the comparator 821 may compare the SAR limit 802 with the first power limit 801a and output a determination result representing to perform the BPS. Accordingly, the RF transceiver may perform the BPS operation and initiate the BPS operation.

Considering that a triggered BPS operation may cause the RF transceiver to selectively transmit and/or receive RF proximity sensing signals or transmit and/or receive RF communication signals at an instance of time, as exemplarily provided in FIG. 6, the RF transceiver may still use the first power limit 801a to limit TX power of transmit RF communication signals in this scenario. In some aspects, the RF transceiver may use the SAR limit 802 to limit TX power of transmit RF communication signals.

Figure 9:
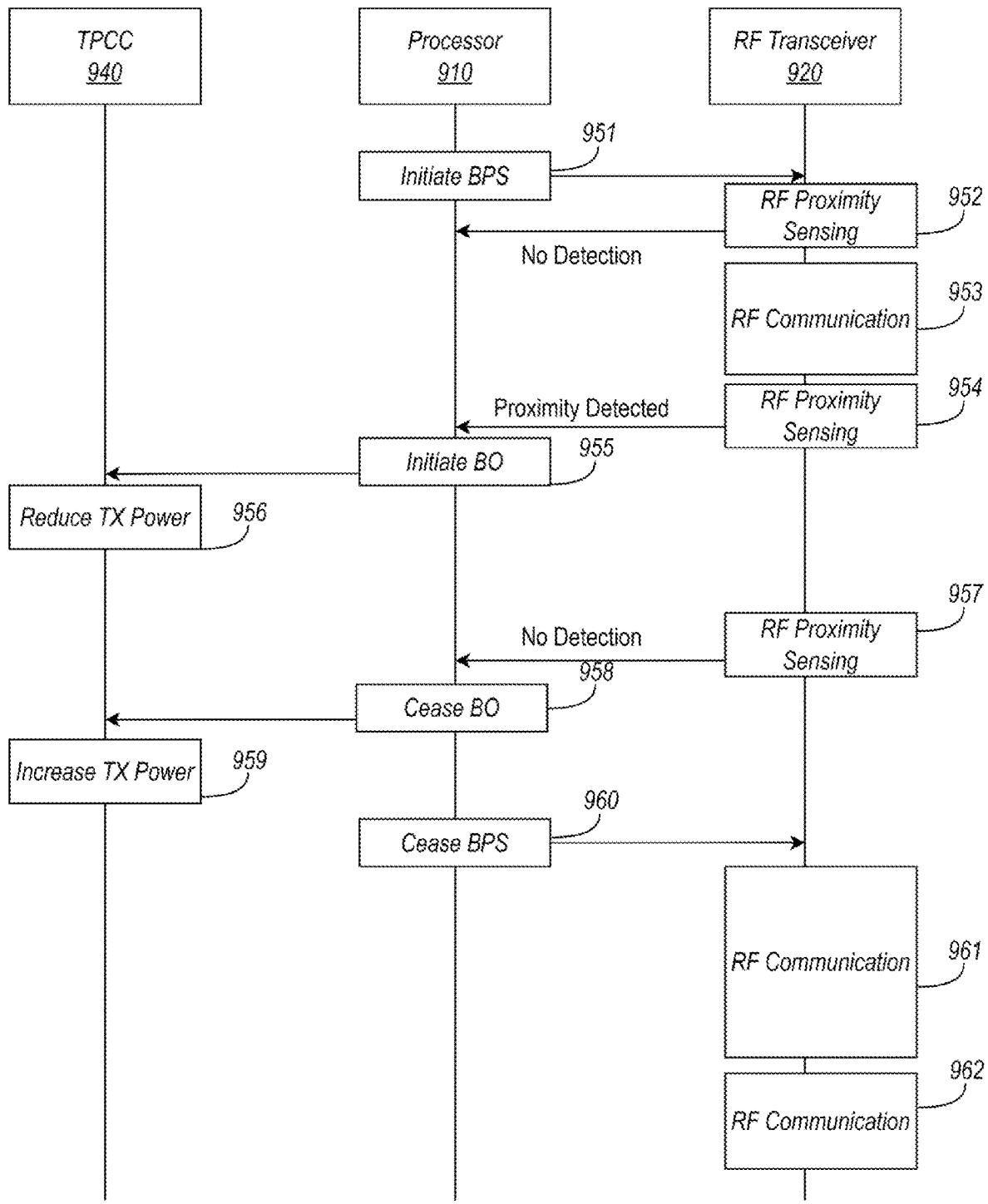
FIG. 9 shows an exemplary illustration of exchange of signals in accordance with various aspects provided herein.

FIG. 9 shows an exemplary illustration of exchange of signals in accordance with various aspects provided herein. A wireless communication device may include an apparatus (e.g. the apparatus 900) including a processor 910 (e.g. the processor 710), an RF transceiver 920 (e.g. the RF transceiver 720), and a transmit power control circuit 940 configured to control TX power of transmit RF communication signals to be transmitted by the RF transceiver 920. The RF transceiver 920 may be configured to perform a BPS operation The processor 910 may determine to initiate a BPS operation based on a monitored power limit parameter and a SAR limit, and accordingly, the processor 910 may initiate 951 the BPS operation. Accordingly, the processor 910 may send an information to cause the RF transceiver 920 to perform the BPS operation. In some examples, the RF transceiver 920 may include a timer configured to cause the RF transceiver 920 to perform multiple RF proximity sensings periodically. In some examples, the processor 910 may configure, for each BPS operation to be performed, trigger the RF transceiver 920 to perform a BPS detection.

Based on the received information from the processor, the RF transceiver 920 may transmit and/or receive RF proximity sensing signals 952 for the BPS detection. Based on the performed BPS detection, the RF transceiver 920 may provide information for proximity detection (e.g. a decision, measurements, etc.), which in this illustration indicates no detection. Accordingly, the processor 910 may cause the RF transceiver to perform RF communication operation 953, until a second BPS detection is to be performed.

The RF transceiver 920 may, for the second BPS detection, transmit and/or receive RF proximity sensing signals 954. Based on the performed BPS detection, the RF transceiver 920 may provide information indicating that a proximity is detected. It is to be noted that the processor 910 may perform determine that a proximity is detected based on information (e.g. measurements) indicating that a proximity is detected. In response to the detected proximity, the processor 910 may determine to apply a BO operation. For this purpose, the processor 910 may initiate 955 the BO by sending a control signal to the TPCC. Based on received control signal, the TPCC 940 may reduce TX power of RF communication signals to be transmitted by the RF transceiver 920.

The RF transceiver 920 may, for a third BPS detection, transmit and/or receive RF proximity sensing signals 957. Based on the performed BPS detection, the RF transceiver 920 may indicate that no proximate object is detected. Based on the information indicating no detection, the processor 910 may determine to cease the application of the BO. Accordingly, the processor 910 may cease 958 the applied BO and send a control signal to the TPCC 940 for the indication. Based on received indication, the TPCC 940 may increase 959 the TX power to a predetermined power level.

Meanwhile, due to dynamic changes with respect to TX power limitation parameters and/or SAR limit, the processor 910 may further determine to cease 960 the BPS operation. Accordingly, the processor 910 may send an information to the RF transceiver 920 to cause the RF transceiver 920 to cease the BPS operation. In case, the processor 910 is configured to trigger each BPS detection by sending a signal to the RF transceiver 920, the processor 910 may cease sending trigger signals to the RF transceiver 920. Thereby, the RF transceiver 920 may proceed with RF communication operations via RF communication signals 961, 962.

Figure 10:
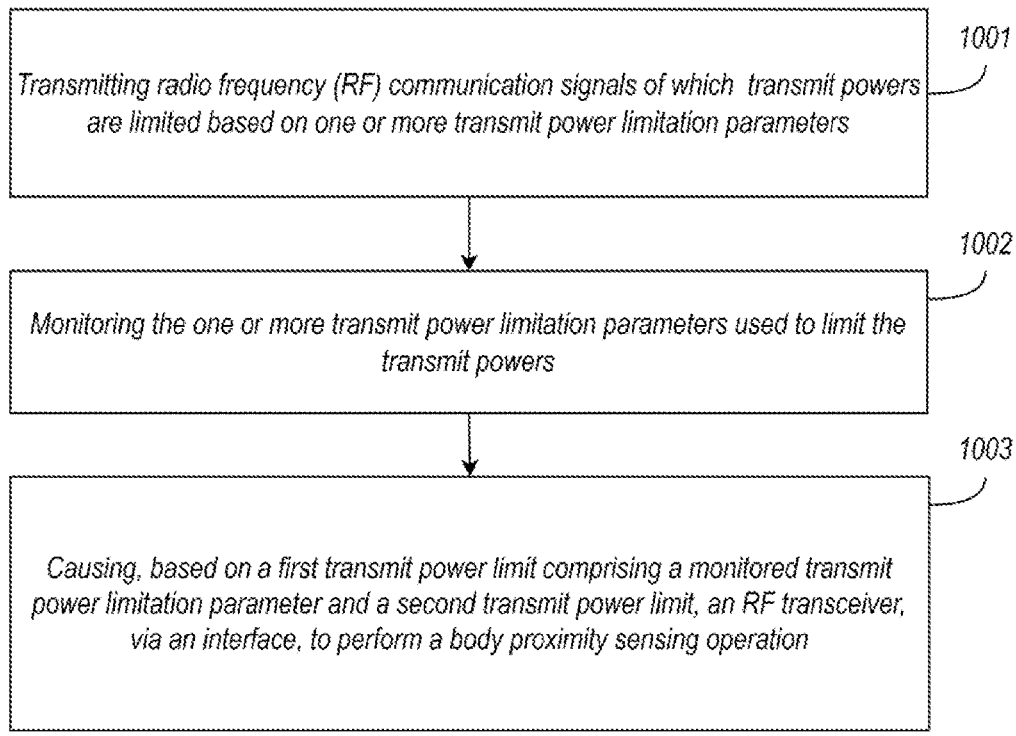
FIG. 10 shows an example of a method.

FIG. 10 shows an example of a method. The method may include transmitting 1001 radio frequency (RF) communication signals of which transmit powers are limited based on one or more transmit power limitation parameters, monitoring 1002 the one or more transmit power limitation parameters used to limit the transmit powers, and causing, based on a first transmit power limit comprising a monitored transmit power limitation parameter and a second transmit power limit, an RF transceiver, via an interface, to perform a body proximity sensing (BPS) operation.

In some examples, the wireless communication device may be configured to perform SAR-related measurements according to a time averaged specific absorption rate (TAS) algorithm for management and/or mitigation of SAR associated with transmission of RF communication signals. A TAS algorithm used by a radio communication device may compute a TAS metric representing an average TX power of transmitted RF signals over a designated period of time. Based on the computed TAS metric and a designated threshold, the radio communication device may take actions accordingly, which may include implementation of a BO operation.

SAR limits defined by regulatory entities may also include a TAS limit, namely an average TX power over a designated period of time, and a radio communication device may be configured to implement SAR-related operations to ensure that RF transmissions of the radio communication device stays below the TAS limit. Computation of the TAS metric may be performed by a TAS algorithm. Practically, regulatory entities may define a framework with respect to computation of TAS metrics, and an implemented TAS algorithm may cause a processor to compute TAS metrics during operation of the device.

Figure 11:
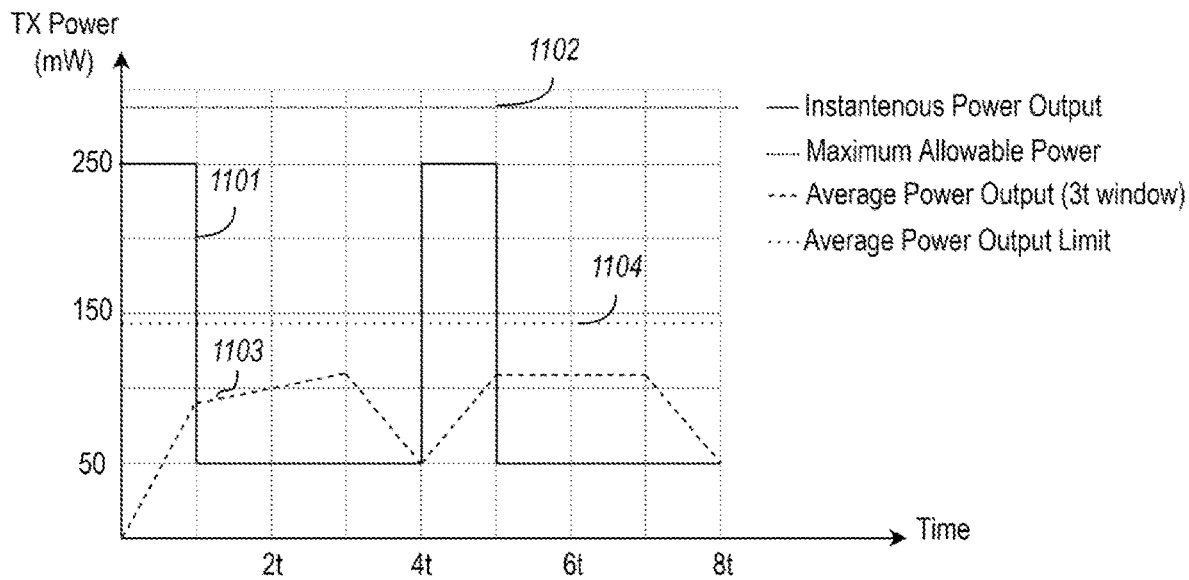
FIG. 11 illustrates an exemplary graph associated with various aspects related to TX power.

FIG. 11 illustrates an exemplary graph associated with various aspects related to TX power. The graph has an x axis denoting the time between 0 and 8t divided in 8 grids and a y axis denoting Power values in mW between 0 and 300 divided in 6 grids. An exemplary instantaneous power output associated with RF communication signals transmitted by a wireless communication device is provided as instantaneous power output 1101 in the graph. A first SAR limit may be designated as a maximum allowable power 1102 which is 285 mW. The graph further shows an average power output (a TAS metric) 1103 computed based on the instantaneous power output 1101 for a period of time of 3t. In other words, the average power output represents, for an instance, a 3t rolling time average of the instantaneous power output 1101 (i.e. for the respective instance "T", TX power associated with transmitted RF signals between T−3t and T). Furthermore, a second SAR limit is designated as an average power output limit 1104 which is set to 140 mW for a 3t rolling time average.

According to the depicted instantaneous power output 1101, transmit RF signals are always present, hence for each 3t time window, the respective TX time period is also 3t, but with different TX powers, namely instantaneous power output 1101 is either 250 mW or 50 mW. A duty cycle is set, such that the instantaneous power output 1101 is 250 mW for a first t and the instantaneous power output 1101 is 50 mW for 3t. The designated limits 1102, 1104 may exemplarily represent respective thresholds to apply a BO operation. If they were regulatory limits designated by regulatory entities, the skilled person would recognize that thresholds below respective limits may be implemented to apply a BO operation to ensure that SAR limits are not reached.

Exemplarily for a first period of time between 0 and t, the instantaneous power output 1101 is 250 mW, resulting in a first SAR budget with respect to instantaneous power output associated with the first period of time of 35 mW. For a second period of time between t and 2t, the instantaneous power output 1101 power is 50 mW, resulting in the first SAR budget being 235 mW for the second period of time. Similarly, for the first period of time between 0 and t, the average power output 1103 increases from 0 mW to around 83.3 mW, resulting in a second SAR budget associated with TAS (i.e. another TAS metric) with respect to average power output associated with the first period of time decreasing from 140 mW to around 56.7 mW during the first period of time. For the second period of time between t and 2t, the average power output 1103 increases from 83.3 mW to 100 mW, resulting in the second SAR budget with respect to average period associated with the second period of time decreasing from 56.7 mW to 40 mW.

In accordance with various aspects provided herein, a processor may initiate (e.g. activate) a BPS operation only when an energy budget is about to exhaust. Since if a SAR budget associated with TAS is not in the region of protection, advantages of applying BOs, or performing RF proximity sensings may be limited, and may not likely cause a change in effect to the TX power. Exemplarily, if TX duty cycle is below a designated duty cycle value, BPS may not be required anyway, as application of the BO may not be required or at least triggered due to SAR limits are beyond reach. Accordingly, the impact of using RF transceiver resources for RF proximity sensing may be reduced, the air time capture corresponding to periods in which RF proximity sensing signals are received and/or transmitted may be minimized, and extra power consumption and connectivity impact relative to performing BPS operation constantly at intervals may be reduced.

In some aspects, an obtained TAS metric may trigger initiation or cease of the BPS operation. Initiation may be conditioned to a time in which energy budget is about to exhaust. Cease may be conditioned in to a particular SAR budget region where BPS has no interest over TAS functionality. In some aspects, it may be desirable to trigger the BPS operation at the time where obtained TAS metric is crossing a respective threshold to apply BO, in order to shorten the latency and/or to prevent TAS BOs in case the BPS operation shows previous proximity indication is no longer valid. In some aspects, the BO operation may co-operate with the BPS operation, such that BO is applied only if the BPS detects an object presence. In some aspects, the BO operation may include applying the BO based on detection information representing the result of RF proximity sensing of the BPS operation according to a first threshold, and applying the BO without such a limitation (without being based on detection information) according to a second threshold.

A TAS algorithm may be configured to compute a TAS metric, at an instant, for a predefined period of time (e.g. period of time indicated by a regulatory TAS limit). Ideally, a TAS metric may represent the average power output associated with instantaneous TX power output as depicted in 1103, but continuous direct measurements of TX power during the operation of RF transceiver may introduce complexities in terms of radio communication performance, RF-circuit complexity, etc.

In some examples, computation of a TAS metric may include calculation of the TAS metric based on a predefined TX power value and TX time periods in which an RF transceiver has actually transmitted RF communication signals within the predefined period. Exemplarily, the predefined TX power value may be one or more TX power limit values (e.g. maximum allowable TX power value) for the TX time periods. In some aspects the computation of the TAS metric may include calculation of the TAS metric based on estimated TX power values for the TX time periods respectively, or TX power values based on measurements for the TX time periods respectively. In some aspects, an obtained TAS metric may include a current or latest TAS metric representing a computed average TX power indicating the current operation of the respective RF transmitter. In some aspects, an obtained TAS metric may include a predicted TAS metric representing a TAS metric predicted for a future instance of time. In some aspects, computation of a TAS metric may include calculating the TAS metric with a moving integral of obtained TX power values for a designated period of time.

In accordance with various aspects provided herein, a wireless communication device may include an RF transceiver configured to perform a BPS operation. In some aspects, a processor of the wireless communication device may control the BPS operation based on an obtained TAS metric. It may be desirable to control the BPS operation according to an obtained TAS metric, such as a computed average TX power, in order to use the resources of the RF transceiver for transmitting RF communication signals efficiently. For example, a processor may cause the RF transceiver to perform the BPS operation according to the obtained TAS metric, such that resources of the RF transceiver are occupied for RF proximity sensing (i.e. by transmitting or receiving RF proximity sensing signals) only when computed average TX power output is close to a respective SAR limit (i.e. TAS limit), such as the computed average TX power output is being above 70%, 80%, or 90% of the respective SAR limit value. In other words, the processor may cause the RF transceiver to perform the BPS operation, when obtained SAR metrics are at a particular region defined between two SAR metric values (e.g. an average TX power value).

Figure 12:
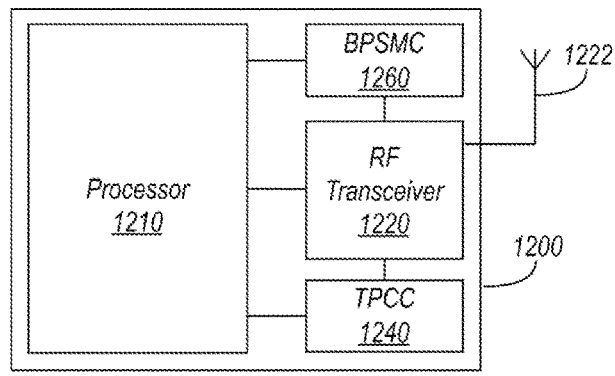
FIG. 12 shows an exemplary illustration of an apparatus for a wireless communication device.

FIG. 12 shows an exemplary illustration of an apparatus for a wireless communication device. The apparatus 1200 may include a processor 1210 (e.g. the processor 710). The processor 1210 may direct and manage communication operations of the apparatus 1200 according to one or more radio communication protocols, and may control transmission/reception of communication signals over at least one or more antenna 1222 via an RF transceiver 1220 (e.g. the RF transceiver 720).

The processor 1210 may include an interface to the RF transceiver 1220 to provide a control of various aspects provided herein. In various examples, the interface may allow the processor 1210 and the RF transceiver 1220 to communicate information (e.g. control signals, measurements, etc.). In some examples, the interface may include the communication path used to exchange receive/transmit communication signals. In some examples, the interface may include one or more designated paths. The processor 1210 may send suitable control signals to the RF transceiver 1210, in particular to corresponding control circuits of the RF transceiver (e.g. a TPCC, a further BO control circuit, a BPS control circuit) respectively to control the radio communication operation, BO operation, or BPS operation.

The RF transceiver 1220 may include at least one RF-chain to process RF signals of antenna 1222 respectively. The apparatus 1200 may include the antenna 1222, or the apparatus 1200 may include an antenna interface couplable to the antenna 1222. It is to be noted that the apparatus 1200 is depicted as being couplable to the antenna 1222, but the apparatus 1200 may be couplable to a plurality of antennas, and thereby the RF transceiver 1220 may include a plurality of RF-chains, each RF-chain may process communication signals for a respective antenna. The apparatus 1200 may transmit and receive radio communication signals with the antenna 1222. The apparatus 1200 may act as an RF transmitter (e.g. RF transmit circuit) to transmit radio communication signals and it may also act as an RF receiver (e.g. RF receive circuit) to receive radio communication signals.

In accordance with various aspects provided herein, the RF transceiver 1220 may be configured to apply a BO. In various examples, the processor 1210 may control the application of the BO. A BO may include a PBO. The processor 1210 may be configured to control one or more components of the RF transceiver 1220 to apply the BO. The application of the BO operation may include the application of a BO operation to the RF transceiver 1220, in particular to all RF-chains of the RF transceiver. In various examples, the application of the BO operation may include the application a BO operation individually for RF-chains of the RF transceiver, or selectively for some of the RF-chains, in cases in which the RF transceiver 1220 may include multiple RF-chains for multiple antennas.

Application of a BO, may include at least one of adjusting transmit power for radio communication signals to be transmitted by the antenna 1222, setting a maximum transmit power value at a respective memory (e.g. a register), which may define a transmit power limit for one or more radio communication signals to be transmitted by the antenna 1222, controlling an operation mode or a gain of an amplifier coupled to the antenna 1222, controlling a supply power controller that may provide power to some components which may include amplifiers of the RF transceiver 1220. Adjustments in the BO may be to reduce Tx power. The processor 1210 may be configured to control the application of the BO. In this illustrative example, the apparatus includes a TPCC 1240 coupled to the RF transceiver 1220, in particular to an amplifier of the RF transceiver 1220, and in order to apply the BO, the TPCC 1240 may cause the amplifier to operate in a designated BO mode in which the gain of the amplifier of the RF transceiver 1220 is reduced to a predefined value for the BO operation.

In a RF communication operation, the RF transceiver 1220 may be configured to transmit RF communication signals (i.e. provide RF communication signals to the antenna 1222 for transmission) which transmit powers (TX power) of the RF communication signals are limited based on one or more TX power limitation parameters. In addition to a designated limitation of SAR, which may include a limit in terms of energy (i.e. total power for a certain period of time), it may be desired to limit TX power of the wireless communication device due to various reasons. Considering the presence of a plurality of TX power limitation parameters corresponding to multiple TX power values, the TX power of an RF communication signal that is set may be limited practically with the minimum TX power value of the multiple TX power values.

The processor 1210 may be configured to perform a TAS algorithm to obtain a TAS metric associated with a period of time. The processor 1210 may obtain the TAS metric according to any known TAS algorithms, some of which are provided in this disclosure. In some aspects, the TAS algorithm may cause the processor 1210 to compute a TAS metric in designated intervals (e.g. every 100 ms, every 1 s, every 10 s etc.). At each interval, the processor 1210 may compute a TAS metric based on a calculated average of determined TX power values associated with transmitted RF communication signals over a designated time period. Determined TX power values may include predefined TX power values (e.g. maximum TX power values for respective transmissions). Determined TX power values may include TX power values estimated based on various parameters related to the RF communication operation (e.g. a calculated TX power value based on a gain parameter of an amplifier). Determined TX power values may be based on measurements performed by a measurement circuit. Exemplarily, the TPCC 1240 may include a measurement circuit configured to perform measurements to determine TX power values.

The apparatus 1200 may further include a memory configured to store data to be used for operations of the processor 1210. The memory may store a SAR limit that is designated particularly to limit SAR. Stored SAR limit may be a predetermined SAR limit. The memory may store threshold information to be used to control the BPS operations (e.g. thresholds provided in accordance with FIG. 12) or the BO operation. The memory may further store the obtained TAS metric, or any TX power values associated with the TAS metric. Exemplarily, the memory may store the determined TX power values, and the processor 1210 may obtain the TAS metric based on stored TX power values. Furthermore, the processor 1210 may calculate SAR budgets based on obtained TAS metric and store information representing the calculated SAR budgets in the memory.

The RF transceiver 1220 may be configured to perform a BPS operation. In a BPS operation, the RF transceiver 1220 may perform monitoring to detect an object (e.g. a human body part) within a proximity of the antenna 1222 using RF proximity sensing signals. Accordingly, the RF transceiver 1220 may be configured to generate transmit RF proximity sensing signals and perform measurements associated with transmitted RF proximity sensing signals (e.g. FIGS. 5A-C) for detection of an object within the proximity of the antenna 1222. The processor 1210 may determine a detection of an object based on a performed BPS operation, in particular based on performed measurements.

For this illustrative example, the apparatus 1200 may include a BPS measurement circuit (BPSMC) 1260. The BPSMC may be configured to perform measurements based on RF proximity sensing signals conveyed by a communication path of the RF transceiver 1220. The RF proximity sensing signals may exemplarily include signals received in response to transmitted RF proximity sensing signals (e.g. FIG. 5A), received RF proximity sensing signals (e.g. FIG. 5B), or reflected transmit RF proximity sensing signals (e.g. FIG. 5C). In the BPS operation for each RF proximity sensing, the BPSMC 1260 may perform measurements to the RF proximity sensing signals and provide measurement information representing measurement results to the processor 1210. The processor 1210 may determine whether there is a proximate object based on provided measurement information representing the measurement results.

The BPS operation may include determining whether there is an object within the proximity of the antenna 1222 based on a detected change. Accordingly, the processor 1210 may cause the memory to store each received measurement result. For each received measurement information associated with an RF proximity sensing performed by the RF transceiver 1220, the processor 1210 may determine whether there is an object presence based on the received measurement information and at least one earlier measurement result stored in the memory. The processor 1210 may perform any known methods (e.g. thresholding, correlation calculation, etc.) to detect a change for the RF proximity sensing according to one or more earlier RF proximity sensings.

In accordance with various aspects provided herein, the processor 1210 may control the BPS operation. The processor 1210 may cause the RF transceiver 1220 to initiate a BPS operation, to cease an initiated BPS operation, change control parameters associated with the BPS operation such as periodicity of the BPS operation, settings associated with RF proximity sensing (e.g. frequency band, modulation, used reference signals), etc. The processor 1210 may control the BPS operation based on obtained TAS metrics. The processor 1210 may cause the RF transceiver 1220 to perform the BPS operation based on an obtained TAS metric.

For example, the processor 1210 may determine whether a designated SAR budget is to be exceeded for RF communication signals to be transmitted based on an obtained TAS metric and a budget. According to a determination result representing that the designated SAR budget is to be exceeded, the processor 1210 may initiate the BPS operation. The processor 1210 may determine the determination result based on the obtained TAS metric and a first BPS threshold. Accordingly, the processor 1210 may initiate the BPS operation in case the obtained TAS metric is above the first BPS threshold. If the obtained TAS metric is below the first BPS threshold, the processor 1210 may not initiate the BPS operation, or may cause the RF transceiver 1220 not to perform the BPS operation, or not to perform RF proximity sensing. Furthermore, based on a further determination result, determined according to a further instance time and the first BPS threshold, representing that the BPS operation is not to be performed, the processor 1210 may cause the RF transceiver 1220 to cease an initiated BPS operation.

In some aspects, for a BPS operation initiated based on a first BPS threshold, the processor 1210 may cease the initiated BPS operation according to a second BPS threshold. It may be desirable to initiate the BPS operation in a state with a lower SAR budget (obtained TAS metric is closer to a respective TAS limit) to delay the triggering of the BPS operation for the radio communication performance, while ceasing the BPS operation in a state with a higher SAR budget (obtained TAS metric is further to the respective TAS limit) to avoid immediate triggering of a further BPS operation. Exemplarily, for a TAS metric-threshold pair representing obtained average TX power value and a designated average TX power value respectively, the first BPS threshold may represent a designated average TX power value greater than respective designated average TX power value of the second BPS threshold.

In some aspects, the processor 1210 may control TX power limits of transmit RF communication signals based on TX power limitation parameters stored in the memory. Based on the stored TX power limitation parameters, and optionally a stored SAR limit (e.g. a TAS limit), the processor 1210 may configure the TPCC 1240 that is configured to control TX power of transmit RF communication signals. The TPCC 1240 may be configured to generate control signals for controlling TX power of transmit RF communication signals. The TPCC 1240 may output generated control signals to an amplifier of the RF transceiver (e.g. a PA or a VGA within a transmit path used to transmit RF communication signals). The amplifier may be configured to amplify input communication signals based on control signals outputted by the TPCC 1240.

The processor 1210 may determine TX power of transmit RF communication signals based on an obtained TAS metric and the SAR limit including the TAS limit. Based on these parameters, and further TX power parameters that may exemplarily depend on quality of the radio communication channel, the processor 1210 may determine a TX power for a transmit RF communication signal. Accordingly, in order to apply the BO, the processor 1210 may cause the TPCC 1240 to configure the amplifier of the RF transceiver 1220 with a predefined gain value for the BO operation to reduce TX power.

Figure 13:
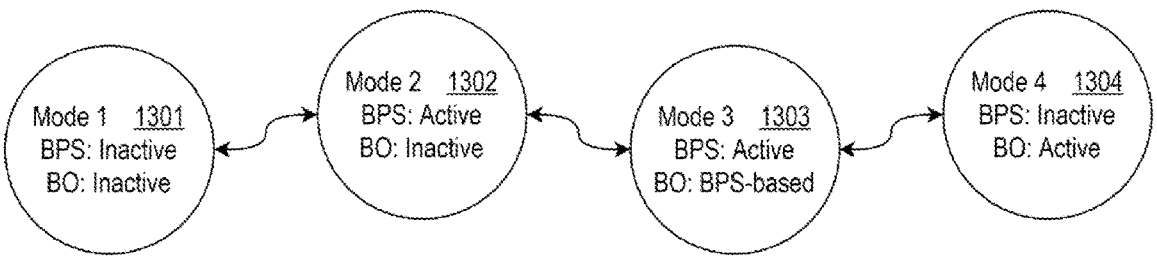
FIG. 13 illustrates exemplary operating modes of an apparatus of a wireless communication device.

FIG. 13 illustrates exemplary operating modes of an apparatus of a wireless communication device including a processor and an RF transceiver. The aspects provided herein may apply to any apparatus of a wireless communication device provided in this disclosure, in particular with respect to apparatus 700 or apparatus 1200. In particular for aspects provided herein with respect to thresholds, thresholds may include designated SAR limit values. A designated SAR limit value may include an instantaneous power limit value, in particular for aspects associated with apparatus 700, and/or a TAS limit value, in particular for aspects associated with apparatus 1200. Aspects may further include determinations based on a threshold and an obtained SAR metric corresponding to the threshold. The obtained SAR metric may include an obtained instantaneous power value, in particular for aspects associated with apparatus 700, and/or an obtained TAS metric, in particular for aspects associated with apparatus 1200.

The apparatus may operate in a first operation mode 1301. In the first operation mode 1301, the processor may control the RF transceiver, such that the RF transceiver does not perform a BPS operation or apply a BO. The processor may obtain SAR metrics and cause the RF transceiver to operate in the first operation mode 1301, based on a first threshold and the obtained SAR metric. The first threshold may define an operating region with the highest SAR budget (e.g. operation with lower SAR metric values (obtained instantaneous power values, obtained average power values) compared to other modes). The processor may trigger a change of the operation mode based on the first threshold, when the first threshold is exceeded.

The apparatus may operate in a second operation mode 1302. In the second operation mode 1302, the processor may control the RF transceiver, such that the RF transceiver may start performing the BPS operation but the RF transceiver does not apply the BO. An intermediate operation mode between the first operation mode 1301 and a third operation mode 1303 may be desirable to ensure that the BPS is operational at the beginning of the third operation mode 1303. Based on an obtained metric and the first threshold, the processor may initiate the BPS operation and cause the RF transceiver to operate in the second operation mode 1303 in which the RF transceiver performs at least one RF proximity sensing. The processor may trigger a change of the operation mode to the third operation mode 1303 based on at least one determination result according to performed at least one RF proximity sensing. In some examples, the processor may trigger the operation mode based on a second threshold. The operating region between the first threshold and the second threshold may define an operating region with a lower SAR budget than the operating region defined by the first threshold. The processor may further trigger a change at the operation mode to the first operation mode 1301 according to an obtained SAR metric during the second operation mode 1302 and the first threshold.

The apparatus may operate in the third operation mode 1303. In the third operation mode 1303, the processor control the RF transceiver such that the RF transceiver performs the BPS operation. The processor may determine whether to apply the BO or not based on the proximity detection of the BPS operation. Exemplarily, for the determination result of an RF proximity sensing representing that an object is detected within the proximity, the processor may apply the BO. The processor may not apply the BO (i.e. adjust TX power to a TX power above designated BO TX power) for a determination result of an RF proximity sensing representing that an object is not detected.

Through such an application of the BO, in which the application of the BO is triggered with the detection of an object within the proximity, it may be considered that an extra SAR budget has been gained, since the apparatus may still transmit RF communication signals without reducing the TX power as it is detected that no object is present within the proximity of the antenna. In particular for the application of TAS related aspects limiting average TX power, RF exposure to an object positioned to the proximity of the antenna between two RF proximity sensing during the BPS operation would be minimal. Due to the nature of this arrangement which may trigger the application of the BO with the first detection of the object according to the RF proximity sensing of the BPS operation, due to application of the BO, the average TX power value may still stay below a designated TAS limit.

In some examples, the processor may trigger a change at the operation mode to a fourth operation mode based on a third threshold. The operating region between the second threshold and the third threshold may define an operating region with a lower SAR budget than the operating region associated with the region between the first threshold and the second threshold. The processor may further trigger a change at the operation mode to the second operation mode 1302 according to an obtained SAR metric during the third operation mode 1303 and the second threshold.

The apparatus may further operate in the fourth operation mode 1304. In the fourth operation mode 1304, the processor may cause the RF transceiver to apply the BO irrespective of the BPS operation. The fourth operation mode 1304 may be considered as a fail-safe mechanism to ensure that the BO is applied irrespective of BPS operation. In the fourth operation mode 1304, the processor may further cease the BPS operation and cause the RF transceiver not to perform further RF proximity sensing to reduce RF exposure quickly. The processor may further trigger a change at the operation mode to the third operation mode 1303 according to an obtained SAR metric during the fourth operation mode 1304 and the third threshold.

Figure 14:
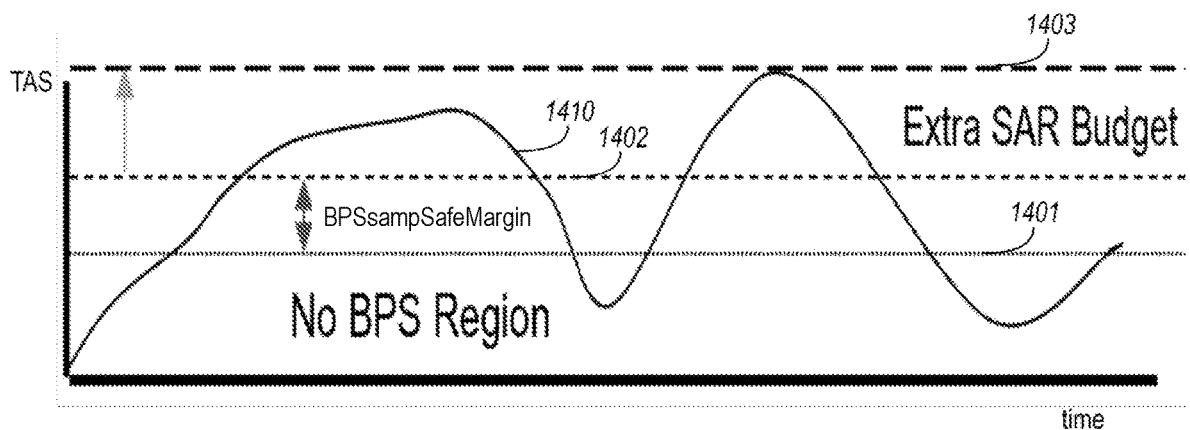
FIG. 14 shows an exemplary graph in accordance with various aspects provided herein.

FIG. 14 shows an exemplary graph in accordance with various aspects provided herein. The graph includes a curve representing TAS metric values 1410 obtained for a period of time. A processor may calculate the obtained TAS metrics via a moving TX power integral (i.e., moving average). X-axis of the graph represents time and Y-axis of the graph represents energy integral value. A first threshold 1401 is shown for the first operation mode 1301 in which no BPS, no BO region, a second threshold 1402 is shown defining a region between the first threshold 1401 and the second region 1402 for the second operation mode 1302 in which only BPS is performed. The line 1403 may represent the extra SAR budget gained due to an implementation of the third operation mode 1303, namely application of the BO based on detections of the BPS operation, under assumption that the second threshold 1402 is provided as an actual TAS limit over which the BO is to be applied.

In this illustrated graph, the transition between the second operation mode 1302 and the third operation mode 1303 is implemented with the presence of the second threshold 1402. The implementation of the second threshold 1402 for this purpose is to maintain a safe margin to cause the BPS operation to perform at least one RF proximity sensing (BPSsampSafeMargin).

Figure 15:
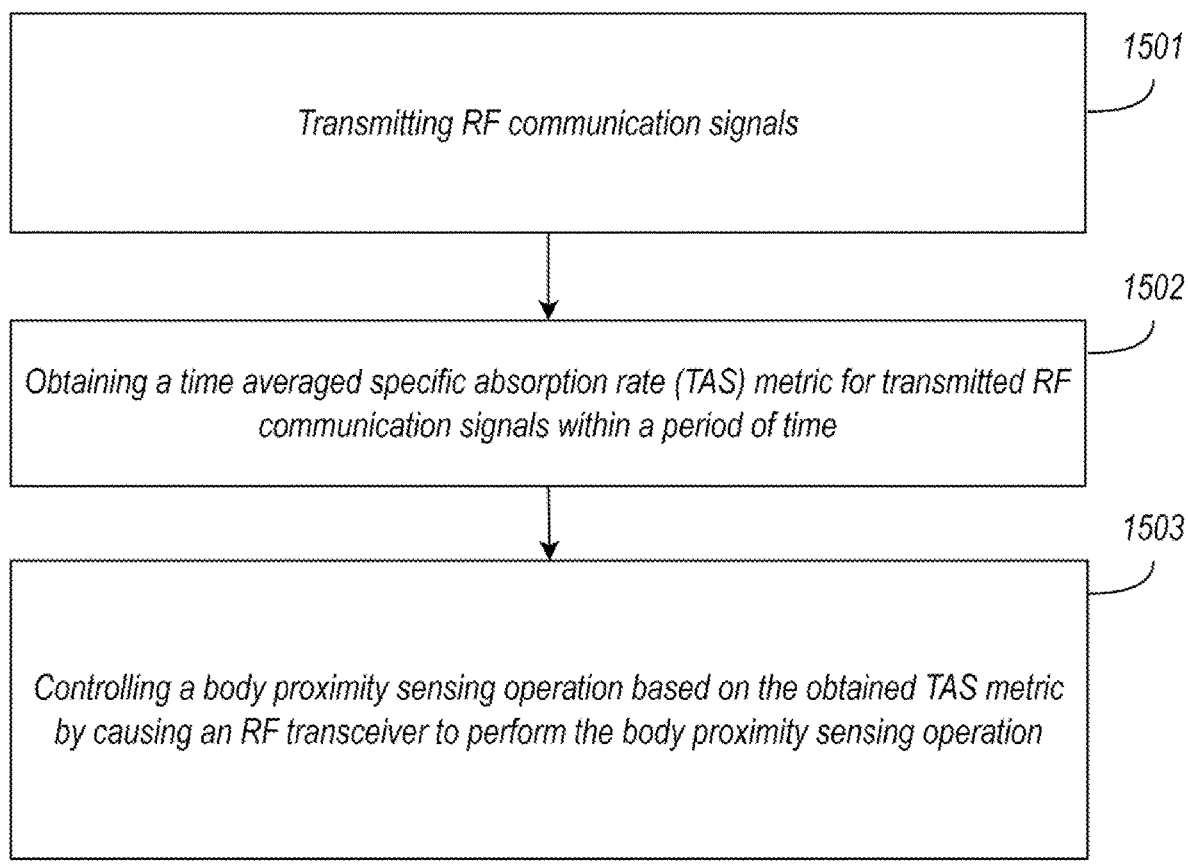
FIG. 15 shows an example of a method.

FIG. 15 shows an example of a method. The method may include transmitting 1501 RF communication signals, obtaining 1502 a time averaged specific absorption rate (TAS) metric for the RF communication signals transmitted within a period of time, and controlling 1503 a body proximity sensing operation based on the obtained TAS metric by causing an RF transceiver to perform the body proximity sensing operation.

The following examples pertain to further aspects of this disclosure.

In example 1A, the subject matter includes an apparatus for a wireless communication device, the apparatus may include: an interface to a radio frequency (RF) transceiver; and processing circuitry configured to: monitor one or more transmit power limitation parameters used to limit transmit power of transmissions of RF communication signals; cause, based on a first transmit power limit may include a monitored transmit power limitation parameter and a second transmit power limit, the RF transceiver to perform a body proximity sensing operation.

In example 2A, the subject matter of example 1A, can optionally include that the second transmit power limit includes a transmit power limit designated as a specific absorption rate (SAR) limit. In example 3A, the subject matter of example 1A or example 2A, can optionally include that the one or more transmit power limitation parameters associated with a transmit RF communication signal include, for the transmit RF communication signal, a predetermined transmit power limit, a regulatory transmit power limit, and/or a system power limit. In example 4A, the subject matter of any one of examples 1A to 3A, may further include: the radio frequency (RF) transceiver configured to transmit the RF communication signals.

In example 5A, the subject matter of example 4A, can optionally include that the processing circuitry is further configured to determine a determination result based on the first transmit power limit and the second transmit power limit; can optionally include that the RF transceiver is configured to initiate the body proximity sensing operation responsive to the determination result. In example 6A, the subject matter of example 5A, can optionally include that the RF transceiver is further configured to cease an initiated body proximity sensing operation based on a further determination result that is determined based on the second transmit power limit and a further transmit power limit associated with a further transmit RF communication signal.

In example 7A, the subject matter of example 6A, can optionally include that the RF transceiver is further configured to perform the body proximity sensing operation until the body proximity sensing operation is ceased based on the further determination result and/or a received instruction. In example 8A, the subject matter of any one of examples 4A to 7A, can optionally include that each of the first transmit power limit and the second transmit power limit includes a respective maximum transmit power value. In example 9A, the subject matter of example 8A, can optionally include that the processing circuitry is configured to compare the first transmit power limit and the second transmit power limit.

In example 10A, the subject matter of example 9, can optionally include that the processing circuitry includes a comparator configured to provide an output based on a comparison of the monitored one or more transmit power limitation parameters and the second power limit; can optionally include that the RF transceiver is responsive to the output of the comparator. In example 11A, the subject matter of example 10A, can optionally include that the comparator includes a first input and a second input configured to receive information representative of the second power limit; can optionally include that the first input is coupled to a logic configured to provide information representative of the first power limit. In example 12A, the subject matter of example 11A, can optionally include that the logic is configured to receive information representative of the one or more transmit power limitation parameters and provide output representative of the first power limit.

In example 13A, the subject matter of any one of examples 8A to 12A, can optionally include that the processing circuitry is configured to cause the RF transceiver to perform the body proximity sensing operation in case the second transmit power limit is less than the first transmit power limit. In example 14A, the subject matter of any one of examples 8A to 13A, can optionally include that the RF transceiver is configured to limit the transmit power of the transmit RF communication signals based on a minimum limitation parameter of the one or more transmit power limitation parameters. In example 15A, the subject matter of example 14A, can optionally include that the first transmit power limit includes the minimum limitation parameter of the one or more transmit power limitation parameters.

In example 16A, the subject matter of any one of examples 8A to 15A, can optionally include that the processing circuitry is further configured to cause the RF transceiver not to perform the body proximity sensing operation in case the second transmit power limit is greater than the first transmit power limit. In example 17A, the subject matter of any one of examples 4A to 16A, may further include a transmit power control circuit configured to control the transmit power of the RF communication signals based on the one or more transmit power limitation parameters and/or based on the body proximity sensing operation. In example 18A, the subject matter of any one of examples 4A to 17A, can optionally include that the RF transceiver is configured to, via an initiated body proximity sensing operation, monitor a presence of a human body part using RF signals, and apply a back-off operation based on a detection of the human body part.

In example 19A, the subject matter of example 18A, can optionally include that the body proximity sensing operation of the RF transceiver includes one or more measurements of the RF signals reflected from the antenna. In example 20A, the subject matter of example 19A, can optionally include that the one or more measurements of reflected RF signals includes detections of voltage standing-wave ratio (VSWR) of the antenna. In example 21A, the subject matter of any one of examples 18A to 20A, can optionally include that the body proximity sensing operation of the RF transceiver includes a detection of a change in a radio communication channel. In example 22A, the subject matter of any one of examples 18A to 21A, can optionally include that the body proximity sensing operation includes a Wi-Fi sensing operation; can optionally include that the RF transceiver is configured to detect the presence of the human body part based on the Wi-Fi sensing operation. In example 23A, the subject matter of any one of examples 4A to 22A, can optionally include that the RF transceiver further includes an antenna. In example 24A, the subject matter of any one of examples 1A to 23A, may further include a memory configured to store the limitation parameters representative of the one or more transmit power limitation parameters and the SAR limit.

In example 25A, the subject matter includes a method that may include: transmitting radio frequency (RF) communication signals of which transmit powers are limited based on one or more transmit power limitation parameters; monitoring the one or more transmit power limitation parameters used to limit the transmit powers; causing, based on a first transmit power limit may include a monitored transmit power limitation parameter and a second transmit power limit, an RF transceiver, via an interface, to perform a body proximity sensing operation.

In example 26A, the subject matter of example 25A, can optionally include that the second transmit power limit includes a transmit power limit designated as a specific absorption rate (SAR) limit. In example 27A, the subject matter of example 25A or example 26A, can optionally include that the one or more transmit power limitation parameters associated with a transmit RF communication signal include, for the transmit RF communication signal, a predetermined transmit power limit, a regulatory transmit power limit, and/or a system power limit. In example 28A, the subject matter of any one of examples 25A to 27A, may further include: determining a determination result based on the first transmit power limit and the second transmit power limit; initiating the body proximity sensing operation responsive to the determination result.

In example 29A, the subject matter of example 28A, may further include: ceasing an initiated body proximity sensing operation based on a further determination result that is determined based on the second transmit power limit and a further transmit power limit associated with a further transmit RF communication signal. In example 30A, the subject matter of example 29A, may further include: performing the body proximity sensing operation until the body proximity sensing operation is ceased based on the further determination result and/or a received instruction. In example 31A, the subject matter of any one of examples 25A to 30A, can optionally include that each of the first transmit power limit and the second transmit power limit includes a respective maximum transmit power value. In example 32A, the subject matter of example 31A, may further include: comparing the first transmit power limit and the second transmit power limit.

In example 33A, the subject matter of example 32A, may further include: providing, by a comparator, an output based on a comparison of the monitored one or more transmit power limitation parameters and the second power limit; can optionally include that the RF transceiver is responsive to the output of the comparator. In example 34A, the subject matter of example 33A, may further include: receiving, by the comparator, information representative of the second power limit via a second input; providing, by a logic, information representative of the first power limit to a first input of the comparator. In example 35A, the subject matter of example 34A, may further include: receiving, by the logic, information representative of the one or more transmit power limitation parameters and provide output representative of the first power limit. In example 36A, the subject matter of any one of examples 31A to 35A, may further include: causing the RF transceiver to perform the body proximity sensing operation in case the second transmit power limit is less than the first transmit power limit.

In example 37A, the subject matter of any one of examples 31A to 36A, may further include: limiting the transmit power of the transmit RF communication signals based on a minimum limitation parameter of the one or more transmit power limitation parameters. In example 38A, the subject matter of example 37A, can optionally include that the first transmit power limit includes the minimum limitation parameter of the one or more transmit power limitation parameters. In example 39A, the subject matter of any one of examples 31A to 38A, may further include: causing the RF transceiver not to perform the body proximity sensing operation in case the second transmit power limit is greater than the first transmit power limit. In example 40A, the subject matter of any one of examples 25A to 39A, may further include: controlling the transmit power of the RF communication signals based on the one or more transmit power limitation parameters and/or based on the body proximity sensing operation.

In example 41A, the subject matter of any one of examples 25A to 40A, may further include: monitoring, via an initiated body proximity sensing operation, a presence of a human body part using RF signals, and applying a back-off operation based on a detection of the human body part. In example 42A, the subject matter of example 42A, can optionally include that the body proximity sensing operation includes performing one or more measurements to the RF signals reflected from the antenna. In example 43A, the subject matter of example 42A, can optionally include that the one or more measurements of reflected RF signals includes detections of voltage standing-wave ratio (VSWR) of the antenna. In example 44A, the subject matter of any one of examples 41A to 43A, can optionally include that the body proximity sensing operation includes detecting a change in a radio communication channel. In example 45A, the subject matter of any one of examples 41A to 44A, can optionally include that the body proximity sensing operation includes a Wi-Fi sensing operation; can optionally include that the method includes detecting the presence of the human body part based on the Wi-Fi sensing operation. In example 46A, the subject matter of any one of examples 25A to 45A, may further include: storing the limitation parameters representative of the one or more transmit power limitation parameters and the SAR limit.

In example 47A, non-transitory computer-readable medium may include one or more instructions which, if executed by a processor of a wireless communication device, cause the processor to: cause an RF transceiver to transmit radio frequency (RF) communication signals of which transmit powers are limited based on one or more transmit power limitation parameters; monitor the one or more transmit power limitation parameters used to limit the transmit powers; cause, based on a first transmit power limit may include a monitored transmit power limitation parameter and a second transmit power limit, the RF transceiver to perform a body proximity sensing operation. In example 48A, non-transitory computer readable medium may include one or more instructions which, if executed by a processor, cause the processor to perform the method of any one of examples 25A to 46A.

In example 49A, an apparatus for a wireless communication device, the apparatus may include: an interface to a radio frequency (RF) transceiver; and processing circuitry configured to: determine a determination result representative of whether to perform a body proximity sensing using RF signals based on the one or more transmit power limits associated with a transmission of a transmit RF communication signal and a threshold; control a performance of the body proximity sensing operation using the RF signals based on the determination result. In example 50A, the subject matter of example 49A, can optionally include that the apparatus is further configured to perform any of the aspects provided herein, in particular aspects provided in examples 1A to 24A.

In example 1B, the subject matter includes an apparatus for a wireless communication device, the apparatus may include: an interface to a radio frequency (RF) transceiver; and a processor configured to: obtain a time averaged specific absorption rate (TAS) metric for RF communication signals transmitted within a period of time; control a body proximity sensing operation via the interface based on the obtained TAS metric.

In example 2B, the subject matter of example 1B, can optionally include that the processing circuitry is further configured to cause the RF transceiver to perform the body proximity sensing operation based on the obtained TAS metric. In example 3B, the subject matter of example 2B, can optionally include that the processing circuitry is further configured to cause the RF transceiver to perform the body proximity sensing operation based on a determination representative of an exceed of a radiation budget with RF communication signals to be transmitted according to the obtained TAS metric. In example 4B, the subject matter of any one of examples 1B to 3B, can optionally include that the processing circuitry is further configured to cause the RF transceiver to perform the body proximity sensing operation based on the obtained TAS metric and a first threshold.

In example 5B, the subject matter of any one of examples 1B to 4B, can optionally include that the processing circuitry is further configured to cause the RF transceiver not to perform the body proximity sensing operation in case the obtained TAS metric is lower than the first threshold. In example 6B, the subject matter of any one of examples 1B to 5B, can optionally include that the processing circuitry is further configured to cause the RF transceiver to cease the performance of the body proximity sensing operation based on the obtained TAS metric.

In example 7B, the subject matter of any one of examples 1B to 5B, can optionally include that the processing circuitry is further configured to cause the RF transceiver to cease an initiated body proximity sensing operation according to the obtained metric based on a further TAS metric obtained for a further period of time within which the initiated body proximity sensing operation has been performed and a second threshold that is different from the first threshold. In example 8B, the subject matter of any one of examples 1B to 7B, can optionally include that the processing circuitry is further configured to determine the TAS metric for the period of time based on a TAS algorithm. In example 9B, the subject matter of any one of examples 1B to 8B, can optionally include that the obtained TAS metric is representative of a total transmit power output associated with the transmission of the transmitted RF communication signals within the period of time may include a plurality of instances of time, each instance of time is associated with a transmit power output.

In example 10B, the subject matter of example 9B, can optionally include that each transmit power output associated with a respective instance of time includes a measured transmit power of a respective transmit RF communication signal. In example 11B, the subject matter of example 10B, can optionally include that each transmit power output associated with a respective instance of time includes a predetermined transmit power. In example 12B, the subject matter of any one of examples 9B to 11B, can optionally include that the processing circuitry is configured to aggregate transmit power outputs for the plurality of instances of time. In example 13B, the subject matter of any one of examples 1 to 12B, may further include: the RF transceiver configured to: transmit and/or receive the RF communication signals; perform a body proximity sensing operation via RF signals. In example 14B, the subject matter of example 13B, can optionally include that the RF transceiver is further configured to apply a back-off operation for transmit RF signals based on the TAS metric and a first back-off threshold.

In example 15B, the subject matter of example 14B, can optionally include that the RF transceiver is further configured to apply the back-off operation for the transmit RF signals based on the TAS metric and a second back-off threshold that is different from the first back-off threshold when the RF transceiver performs the body proximity sensing operation. In example 16B, the subject matter of example 15B, may further include a transmit power control circuit configured to control transmit power of the RF communication signals to be transmitted by the RF transceiver, can optionally include that the processing circuitry is further configured to control the transmit power control circuit to apply the back-off operation.

In example 17B, the subject matter of any one of examples 13B to 16B, can optionally include that the RF transceiver is configured to, via an initiated body proximity sensing operation, monitor a presence of a human body part, and apply a back-off operation based on a detection of the human body part. In example 18B, the subject matter of example 17B, can optionally include that the body proximity sensing operation of the RF transceiver includes one or more measurements of RF signals reflected from the antenna. In example 19B, the subject matter of example 18B, can optionally include that the one or more measurements of reflected RF signals includes detections of voltage standing-wave ratio (VSWR) of the antenna. In example 20B, the subject matter of any one of examples 17B to 19B, can optionally include that the body proximity sensing operation of the RF transceiver includes a detection of a change in a radio communication channel. In example 21B, the subject matter of any one of examples 17B to 20B, can optionally include that the body proximity sensing operation includes a Wi-Fi sensing operation; can optionally include that the RF transceiver is configured to detect the presence of the human body part based on the Wi-Fi sensing operation. In example 22B, the subject matter of any one of examples 13B to 21B, can optionally include that the RF transceiver further includes an antenna. In example 23B, the subject matter of any one of examples 1B to 22B, may further include a memory configured to store the TAS metric.

In example 24B, the subject matter includes a method that may include: transmitting RF communication signals; obtaining a time averaged specific absorption rate (TAS) metric for the RF communication signals transmitted within a period of time; controlling a body proximity sensing operation based on the obtained TAS metric by causing an RF transceiver to perform the body proximity sensing operation.

In example 25B, the subject matter of example 24B, may further include: causing the RF transceiver to perform the body proximity sensing operation based on the obtained TAS metric. In example 26B, the subject matter of example 25B, may further include: causing the RF transceiver to perform the body proximity sensing operation based on a determination representative of an exceed of a radiation budget with RF communication signals to be transmitted according to the obtained TAS metric. In example 27B, the subject matter of any one of examples 24B to 26B, may further include: causing the RF transceiver to perform the body proximity sensing operation based on the obtained TAS metric and a first threshold.

In example 28B, the subject matter of any one of examples 24B to 27B, may further include: causing the RF transceiver not to perform the body proximity sensing operation in case the obtained TAS metric is lower than the first threshold. In example 29B, the subject matter of any one of examples 24B to 28B, may further include: causing the RF transceiver to cease the performance of the body proximity sensing operation based on the obtained TAS metric. In example 30B, the subject matter of any one of examples 24B to 29B, may further include: causing the RF transceiver to cease an initiated body proximity sensing operation according to the obtained metric based on a further TAS metric obtained for a further period of time within which the initiated body proximity sensing operation has been performed and a second threshold that is different from the first threshold. In example 31B, the subject matter of any one of examples 24B to 30B, may further include: determining the TAS metric for the period of time based on a TAS algorithm.

In example 32B, the subject matter of any one of examples 24B to 31B, can optionally include that the obtained TAS metric is representative of a total transmit power output associated with the transmission of the transmitted RF communication signals within the period of time may include a plurality of instances of time, each instance of time is associated with a transmit power output. In example 33B, the subject matter of example 32B, can optionally include that each transmit power output associated with a respective instance of time includes a measured transmit power of a respective transmit RF communication signal. In example 34B, the subject matter of example 33B, can optionally include that each transmit power output associated with a respective instance of time includes a predetermined transmit power. In example 35B, the subject matter of any one of examples 32B to 34B, can optionally include that the processing circuitry is configured to aggregate transmit power outputs for the plurality of instances of time.

In example 36B, the subject matter of any one of examples 24B to 35B, may further include: transmitting and/or receiving, by an RF transceiver, the RF communication signals; performing, by the RF transceiver, the body proximity sensing operation via RF signals. In example 37B, the subject matter of example 36B, may further include: applying a back-off operation for transmit RF signals based on the TAS metric and a first back-off threshold. In example 38B, the subject matter of example 37B, may further include: applying the back-off operation for the transmit RF signals based on the TAS metric and a second back-off threshold that is different from the first back-off threshold when the RF transceiver performs the body proximity sensing operation. In example 39B, the subject matter of example 38B, may further include: controlling transmit power of the RF communication signals to be transmitted by the RF transceiver, controlling a transmit power control circuit to apply the back-off operation.

In example 40B, the subject matter of any one of examples 36B to 39B, may further include: monitoring, via an initiated body proximity sensing operation, a presence of a human body part, and apply a back-off operation based on a detection of the human body part. In example 41B, the subject matter of example 40B, may further include: can optionally include that the body proximity sensing operation includes performing one or more measurements of RF signals reflected from the antenna. In example 42B, the subject matter of example 42B, can optionally include that the one or more measurements of reflected RF signals includes detections of voltage standing-wave ratio (VSWR) of the antenna. In example 43B, the subject matter of any one of examples 40B to 42B, can optionally include that the body proximity sensing operation includes detecting a change in a radio communication channel.

In example 44B, the subject matter of any one of examples 40B to 43B, can optionally include that the body proximity sensing operation includes a Wi-Fi sensing operation; can optionally include that the method further includes detecting the presence of the human body part based on the Wi-Fi sensing operation. In example 45B, the subject matter of any one of examples 24B to 44B, storing the TAS metric in a memory.

In example 46B, non-transitory computer-readable medium may include one or more instructions which, if executed by a processor of a wireless communication device, cause the processor to: cause an RF transceiver to transmit radio frequency (RF) communication signals; obtain a time averaged specific absorption rate (TAS) metric for the RF communication signals transmitted within a period of time; control a body proximity sensing operation based on the obtained TAS metric, in which the RF transceiver transmits RF signals for the body proximity sensing operation. In example 47B, non-transitory computer-readable medium may include one or more instructions which, if executed by a processor, cause the processor to perform the methods of any one of examples 24B to 45B.

In example 48B, an apparatus for a wireless communication device, the apparatus may include: an interface to a radio frequency (RF) circuit; and a processor configured to: determine a time averaged specific absorption rate (TAS) metric for the communication operations within a period of time; cause the RF circuit, via the interface, to perform the body proximity sensing operation based on the determined TAS metric. In example 49B, the subject matter of example 48, can optionally include that the apparatus is further configured to perform any of the aspects provided herein, in particular any one of the aspects provided in examples 1B to 23B.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" or "processing circuitry" as, for example, used herein may be understood as any kind of technological entity that allows handling of data. The data may be handled according to one or more specific functions executed by the processor. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

The term "user device" is intended to refer to a device of a user (e.g. occupant) that may be configured to provide information related to the user. The user device may exemplarily include a mobile phone, a smart phone, a wearable device (e.g. smart watch, smart wristband), a computer, etc.

As utilized herein, terms "module", "component," "system," "circuit," "element," "slice." "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "instance of time" refers to a time of a particular event or situation according to the context. The instance of time may refer to an instantaneous point in time, or to a period of time which the particular event or situation relates to.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, Zig-Bee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method. All acronyms defined in the above description additionally hold in all claims included herein.

What is claimed is:

1. An apparatus for a wireless communication device, the apparatus comprising:
    an interface to a radio frequency (RF) transceiver; and
    processing circuitry configured to:
        monitor one or more transmit power limitation parameters used to limit transmit power of transmissions of RF communication signals; and
        cause, based on a first transmit power limit comprising a monitored transmit power limitation parameter and a second transmit power limit, the RF transceiver to perform a body proximity sensing operation.

2. The apparatus of claim 1,
    wherein the second transmit power limit comprises a transmit power limit designated as a specific absorption rate (SAR) limit.

3. The apparatus of claim 1,
    wherein the one or more transmit power limitation parameters associated with a transmit RF communication signal comprise, for the transmit RF communication signal, a predetermined transmit power limit, a regulatory transmit power limit, and/or a system power limit.

4. The apparatus of claim 1, further comprising:

the radio frequency (RF) transceiver configured to transmit selectively an RF communication signal or an RF proximity sensing signal.

5. The apparatus of claim 4, wherein the processing circuitry is further configured to determine a determination result based on the first transmit power limit and the second transmit power limit, wherein the RF transceiver is configured to initiate the body proximity sensing operation responsive to the determination result.

6. The apparatus of claim 5, wherein the RF transceiver is further configured to cease an initiated body proximity sensing operation based on a further determination result that is determined based on the second transmit power limit and a further transmit power limit associated with a further transmit RF communication signal.

7. The apparatus of claim 6, wherein the RF transceiver is further configured to perform the body proximity sensing operation until the body proximity sensing operation is ceased based on the further determination result and/or a received instruction.

8. The apparatus of claim 4, wherein each of the first transmit power limit and the second transmit power limit comprises a respective maximum transmit power value, wherein the processing circuitry comprises a comparator configured to provide an output based on a comparison of the monitored one or more transmit power limitation parameters and the second power limit, wherein the RF transceiver is responsive to the output of the comparator.

9. The apparatus of claim 8, wherein the comparator comprises a first input and a second input configured to receive information representative of the second power limit, wherein the first input is coupled to a logic configured to provide information representative of the first power limit.

10. The apparatus of claim 9, wherein the logic is configured to receive information representative of the one or more transmit power limitation parameters and provide output representative of the first power limit.

11. The apparatus of claim 4, wherein the RF transceiver is configured to, via an initiated body proximity sensing operation, monitor a presence of a human body part using RF signals, and apply a back-off operation based on a detection of the human body part.

12. A non-transitory computer-readable medium comprising one or more instructions which, if executed by a processor of a wireless communication device, cause the processor to:

cause an RF transceiver to transmit radio frequency (RF) communication signals of which transmit powers are limited based on one or more transmit power limitation parameters;

monitor the one or more transmit power limitation parameters used to limit the transmit powers; and cause, based on a first transmit power limit comprising a monitored transmit power limitation parameter and a second transmit power limit, the RF transceiver to perform a body proximity sensing operation.

13. The non-transitory computer-readable medium of claim 12, wherein the second transmit power limit comprises a transmit power limit designated as a specific absorption rate (SAR) limit.

14. An apparatus for a wireless communication device, the apparatus comprising:

an interface to a radio frequency (RF) transceiver; and processing circuitry configured to:

obtain a time averaged specific absorption rate (TAS) metric for RF communication signals transmitted within a period of time; and control a body proximity sensing operation via the interface based on the obtained TAS metric.

15. The apparatus of claim 14, wherein the processing circuitry is further configured to cause the RF transceiver to perform the body proximity sensing operation based on the obtained TAS metric.

16. The apparatus of claim 15, wherein the processing circuitry is further configured to cause the RF transceiver to perform the body proximity sensing operation based on a determination representative of an exceed of a radiation budget with RF communication signals to be transmitted according to the obtained TAS metric.

17. The apparatus of claim 14, wherein the processing circuitry is further configured to cause the RF transceiver to perform the body proximity sensing operation based on the obtained TAS metric and a first threshold.

18. The apparatus of claim 14, further comprising:

the RF transceiver configured to:

transmit and/or receive the RF communication signals; and perform a body proximity sensing operation via RF proximity sensing signals.

19. The apparatus of claim 14, wherein the RF transceiver is further configured to apply a back-off operation for transmit RF signals based on the TAS metric and a first back-off threshold.

20. The apparatus of claim 19, wherein the RF transceiver is further configured to apply the back-off operation for the transmit RF signals based on the TAS metric and a second back-off threshold that is different from the first back-off threshold when the RF transceiver performs the body proximity sensing operation.

21. The apparatus of claim 19, further comprising a transmit power control circuit configured to control transmit power of the RF communication signals to be transmitted by the RF transceiver, wherein the processing circuitry is further configured to control the transmit power control circuit to apply the back-off operation.

22. The apparatus of claim 14, wherein the RF transceiver is configured to, via an initiated body proximity sensing operation, monitor a presence of a human body part, and apply a back-off operation based on a detection of the human body part.

23. The apparatus of claim 14, wherein the body proximity sensing operation of the RF transceiver comprises a detection of a change in a radio communication channel.

24. A non-transitory computer-readable medium comprising one or more instructions which, if executed by a processor of a wireless communication device, cause the processor to:

cause an RF transceiver to transmit radio frequency (RF) communication signals;

obtain a time averaged specific absorption rate (TAS) metric for the RF communication signals transmitted within a period of time; and control a body proximity sensing operation based on the obtained TAS metric, in which the RF transceiver transmits RF signals for the body proximity sensing operation.

25. The non-transitory computer-readable medium of claim 24, wherein the body proximity sensing operation of the RF transceiver comprises a detection of a change in a radio communication channel.

* * * * *